United States Patent
Takahashi

(10) Patent No.: US 12,374,154 B2
(45) Date of Patent: Jul. 29, 2025

(54) DETECTION DEVICE, LEARNING DEVICE, DETECTION METHOD AND STORAGE MEDIUM

(71) Applicant: NEC Corporation, Tokyo (JP)

(72) Inventor: Koichi Takahashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 570 days.

(21) Appl. No.: 17/636,432

(22) PCT Filed: Jul. 3, 2020

(86) PCT No.: PCT/JP2020/026278
§ 371 (c)(1),
(2) Date: Feb. 18, 2022

(87) PCT Pub. No.: WO2022/003982
PCT Pub. Date: Jan. 6, 2022

(65) Prior Publication Data
US 2022/0270398 A1    Aug. 25, 2022

(51) Int. Cl.
*G06V 40/16*       (2022.01)
*G06N 3/045*      (2023.01)
(Continued)

(52) U.S. Cl.
CPC ........... *G06V 40/164* (2022.01); *G06N 3/045* (2023.01); *G06N 3/08* (2013.01); *G06V 40/12* (2022.01); *G06V 40/70* (2022.01)

(58) Field of Classification Search
CPC ...... G06V 40/164; G06V 40/12; G06V 40/70; G06V 10/82; G06V 40/171; G06V 40/18;
(Continued)

(56) References Cited

U.S. PATENT DOCUMENTS

| 9,245,206 B2 * | 1/2016 | Nomoto | G06V 40/172 |
| 2014/0257805 A1 | 9/2014 | Huang et al. | |

(Continued)

FOREIGN PATENT DOCUMENTS

| CN | 104598797 A | * | 5/2015 | |
| CN | 109697395 A | * | 4/2019 | G06K 9/00228 |

(Continued)

OTHER PUBLICATIONS

Zhuang et al., "Multi-task Learning of Cascaded CNN for Facial Attribute Classification," 2018 24th International Conference on Pattern Recognition (ICPR), Beijing, China, 2018, pp. 2069-2074, doi: 10.1109/ICPR.2018.8545271. (Year: 2018).*

(Continued)

*Primary Examiner* — Emily C Terrell
*Assistant Examiner* — Julia Z. Yao

(57) ABSTRACT

The detection device 1X mainly includes an acquisition means 12X, a common feature quantity extraction means 13X, a feature information detection means 14X, an attribute identification means 15X, and an output means 16X. The acquisition means 12X acquires data relating to a detection target. The common feature quantity extraction means 13X extracts, from the data, common feature quantity common to plural candidates of an attribute of the detection target. The feature information detection means 14X detects the feature information for each of the plural candidates based on the common feature quantity. The attribute identification means 15X identifies the attribute of the detection target based on the data. The output means 16X outputs the feature information corresponding to the identified attribute.

9 Claims, 15 Drawing Sheets

(51) Int. Cl.
*G06N 3/08* (2023.01)
*G06V 40/12* (2022.01)
*G06V 40/70* (2022.01)

(58) Field of Classification Search
CPC .......... G06N 3/045; G06N 3/08; G06N 3/048; G06N 3/084; G06T 7/00; G10L 15/16
See application file for complete search history.

(56) References Cited

U.S. PATENT DOCUMENTS

| | | | |
|---|---|---|---|
| 2020/0012887 A1 | | 1/2020 | Li et al. |
| 2022/0076000 A1* | | 3/2022 | Yang ................... G06V 20/597 |

FOREIGN PATENT DOCUMENTS

| | | | | |
|---|---|---|---|---|
| CN | 110647865 A | * | 1/2020 | ........... G06F 18/214 |
| JP | H09-065032 A | | 3/1997 | |
| WO | 2016/026063 A1 | | 2/2016 | |

OTHER PUBLICATIONS

Wang et al, "Multi-task Deep Neural Network for Joint Face Recognition and Facial Attribute Prediction," 2017 in proceedings of the 2017 ACM on International Conference on Multimedia Retrieval (ICMR '17). Association for Computing Machinery, 365-374. https://doi.org/10.1145/3078971.3 (Year: 2017).*

Z. Zhang et al., "Facial Landmark Detection by Deep Multi-task Learning," 2014, In: Computer Vision—ECCV 2014, Lecture Notes in Computer Science, vol. 8694. Springer, Cham. https://doi.org/10.1007/978-3-319-10599-4_7 (Year: 2014).*

Yin et al., "Multi-Task Convolutional Neural Network for Pose-Invariant Face Recognition," in IEEE Transactions on Image Processing, vol. 27, No. 2, pp. 964-975, Feb. 2018, doi: 10.1109/TIP.2017.2765830. (Year: 2018).*

Xiong et al., "Conditional Convolutional Neural Network for Modality-Aware Face Recognition," 2015 IEEE International Conference on Computer Vision (ICCV), Santiago, Chile, 2015, pp. 3667-3675, doi: 10.1109/ICCV.2015.418. (Year: 2015).*

Barr et al., "The effectiveness of face detection algorithms in unconstrained crowd scenes," IEEE Winter Conference on Applications of Computer Vision, Steamboat Springs, CO, USA, 2014, pp. 1020-1027, doi: 10.1109/WACV.2014.6835992. (Year: 2014).*

Liu et al., "Multi-view face detection based on cascade classifier and skin color," 2012 IEEE 2nd International Conference on Cloud Computing and Intelligence Systems, Hangzhou, China, 2012, pp. 56-60, doi: 10.1109/CCIS.2012.6664367. (Year: 2012).*

Murphy-Chutorian, "Head Pose Estimation in Computer Vision: A Survey," in IEEE Transaction on Pattern Analysis and Machine Intelligence, vol. 31, No. 4, pp. 607-626, Apr. 2009, doi: 10-1109/TPAMI.2008.106. (Year: 2008).*

Cho et al., "Hardware acceleration of multi-view face detection," 2009 IEEE 7th Symposium on Application Specific Processors, San Francisco, CA, USA, 2009, pp. 66-69, doi: 10.1109/SASP.2009.5226339. (Year: 2009).*

International Search Report for PCT Application No. PCT/JP2020/026278, mailed on Sep. 15, 2020.

Zhen-Hua Feng et al., "Wing Loss for Robust Facial Landmark Localisation with Convolutional Neural Networks", Computer Vision and Pattern Recognition (cs.CV), https://doi.org/10.48550/arXiv.1711.06753, p. 1-11.

Zhe Cao et al., "Realtime Multi-Person 2D Pose Estimation using Part Affinity Fields", 2017 IEEE Conference on Computer Vision and Pattern Recognition (CVPR), pp. 7291-7299.

Wenyan Wu et al., "Leveraging Intra and Inter-Dataset Variations for Robust Face Alignment", IEEE, 2017 IEEE Conference on Computer Vision and Pattern Recognition Workshops (CVPRW), pp. 150-159.

Paul Viola et al., "Rapid Object Detection Using a Boosted Cascade of Simple Features", Computer Vision and Pattern Recognition 2001, pp. 1-9.

Karen Simonyan et al., "Very Deep Convolutional Networks for Large-Scale Image Recognition", conference paper at ICLR 2015, arXiv:1409.1556v6 [cs.CV] Apr. 10, 2015, pp. 1-14.

* cited by examiner

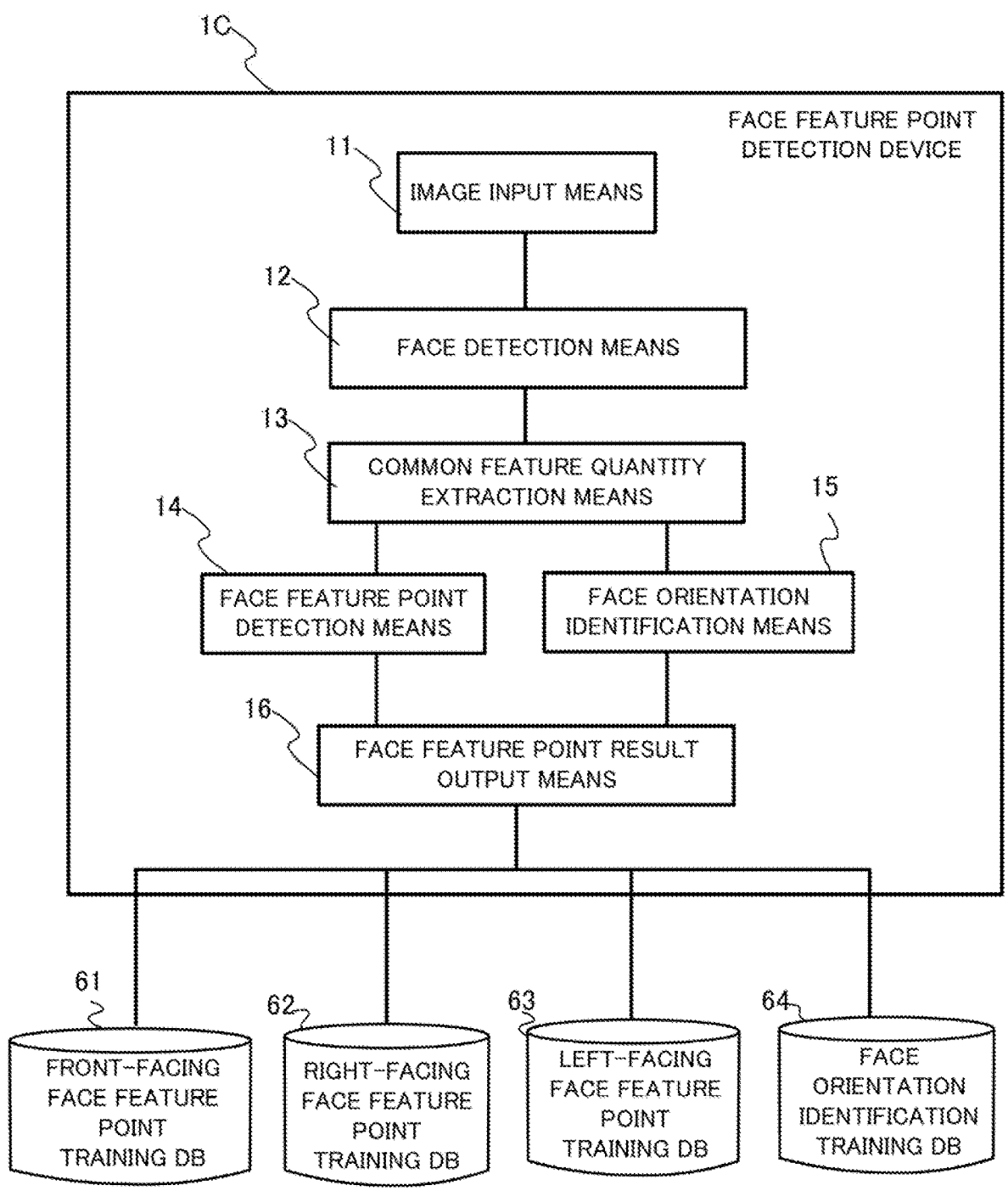

DETECTION DEVICE, LEARNING DEVICE, DETECTION METHOD AND STORAGE MEDIUM

This application is a National Stage Entry of PCT/JP2020/026278 filed on Jul. 3, 2020, the contents of all of which are incorporated herein by reference, in their entirety.

TECHNICAL FIELD

The present disclosure relates to a technical field of a detection device, a detection method, and a storage medium for performing a process of detecting a target feature of detection.

BACKGROUND ART

Face feature point detection is a technique to detect feature points such as pupil center of eyes from a face image, and detected face feature point information is utilized for face recognition, expression analysis, and the like. It is indispensable to accurately recognize the position and the shape of eyes, a nose, and a mouth in order to carry out face recognition and expression analysis with a high degree of accuracy. Non-Patent Document 1 to Non-Patent Document 5 disclose techniques related to face feature point detection.

PRIOR ART DOCUMENTS

Non-Patent Literature

Non-Patent Literature 1: Zhen-Hua Feng, Josef Kittler, Muhammad Awais, Patrik Huber, Xiao-Jun Wu, "Wing Loss for Robust Facial Landmark Localisation with Convolutional Neural Networks", Computer Vision and Pattern Recognition, 2018.

Non-Patent Literature 2: Zhe Cao, Tomas Simon, Shih-En Wei, Yaser Sheikh, "Realtime Multi-Person 2D Pose Estimation using Part Affinity Fields", Computer Vision and Pattern Recognition, 2018.

Non-Patent Literature 3: Wenyan Wu, Shuo Yang, "Leveraging Intra and Inter-Dataset Variations for Robust Face Alignment", Computer Vision and Pattern Recognition, 2017.

Non-Patent Literature 4: Paul Viola, Michael Jones, "Rapid Object Detection Using a Boosted Cascade of Simple Features", Computer Vision and Pattern Recognition, 2011.

Non-Patent Literature 5: Karen Simonyan, Andrew Zisserman, "Very Deep Convolutional Networks for Large-Scale Image Recognition", International Conference on Learning Representations, 2015.

SUMMARY

Problem to be Solved

In face recognition and expression analysis of a laterally-facing person, since the eye and the mouth corner on the far side from the screen become invisible, it is necessary to switch the feature points to be used between the case of a face captured from the front side and the case of a face captured from the lateral side. Even in the case where a detection target other than a human face has temporarily or partially different attributes, it is necessary to detect the feature point or feature quantity of the detection target according to the attribute of the detection target.

In view of the above-described issue, it is therefore an example object of the present disclosure to provide a detection device, detection method, and a storage medium capable of suitably performing a feature detection dealing with plural attributes of the detection target.

Means for Solving the Problem

In one mode of the detection device, there is provided a detection device including:
an acquisition means for acquiring data relating to a detection target;
a common feature quantity extraction means for extracting, from the data, common feature quantity common to plural candidates of an attribute of the detection target;
a feature information detection means for detecting feature information of the detection target for each of the plural candidates based on the common feature quantity;
an attribute identification means for identifying the attribute based on the data; and
an output means for outputting the feature information corresponding to the identified attribute.

In one mode of the detection method, there is provided a detection method executed by a computer, including:
acquiring data relating to a detection target;
extracting, from the data, common feature quantity common to plural candidates of an attribute of the detection target;
detecting feature information of the detection target for each of the plural candidates based on the common feature quantity;
identifying the attribute based on the data; and
outputting the feature information corresponding to the identified attribute.

In one mode of the storage medium, there is provided a storage medium storing a program executed by a computer, the program causing the computer to:
acquire data relating to a detection target;
extract, from the data, common feature quantity common to plural candidates of an attribute of the detection target;
detect feature information of the detection target for each of the plural candidates based on the common feature quantity;
identify the attribute based on the data; and
output the feature information corresponding to the identified attribute.

In one mode of the learning device, there is provided a learning device including
a learning means for learning a neural network which outputs, when data relating to a detection target is inputted thereto, information relating to common feature quantity common to plural candidates of an attribute of the detection target.

BRIEF DESCRIPTION OF THE DRAWINGS

FIG. 19 is a block diagram showing a functional configuration of a face feature point detection device according to a fifth example embodiment.

EXAMPLE EMBODIMENTS

Hereinafter, with reference to the drawings, example embodiments of a detection device, a detection method and a storage medium will be described.

First Example Embodiment (1) Functional Block

Figure 1:
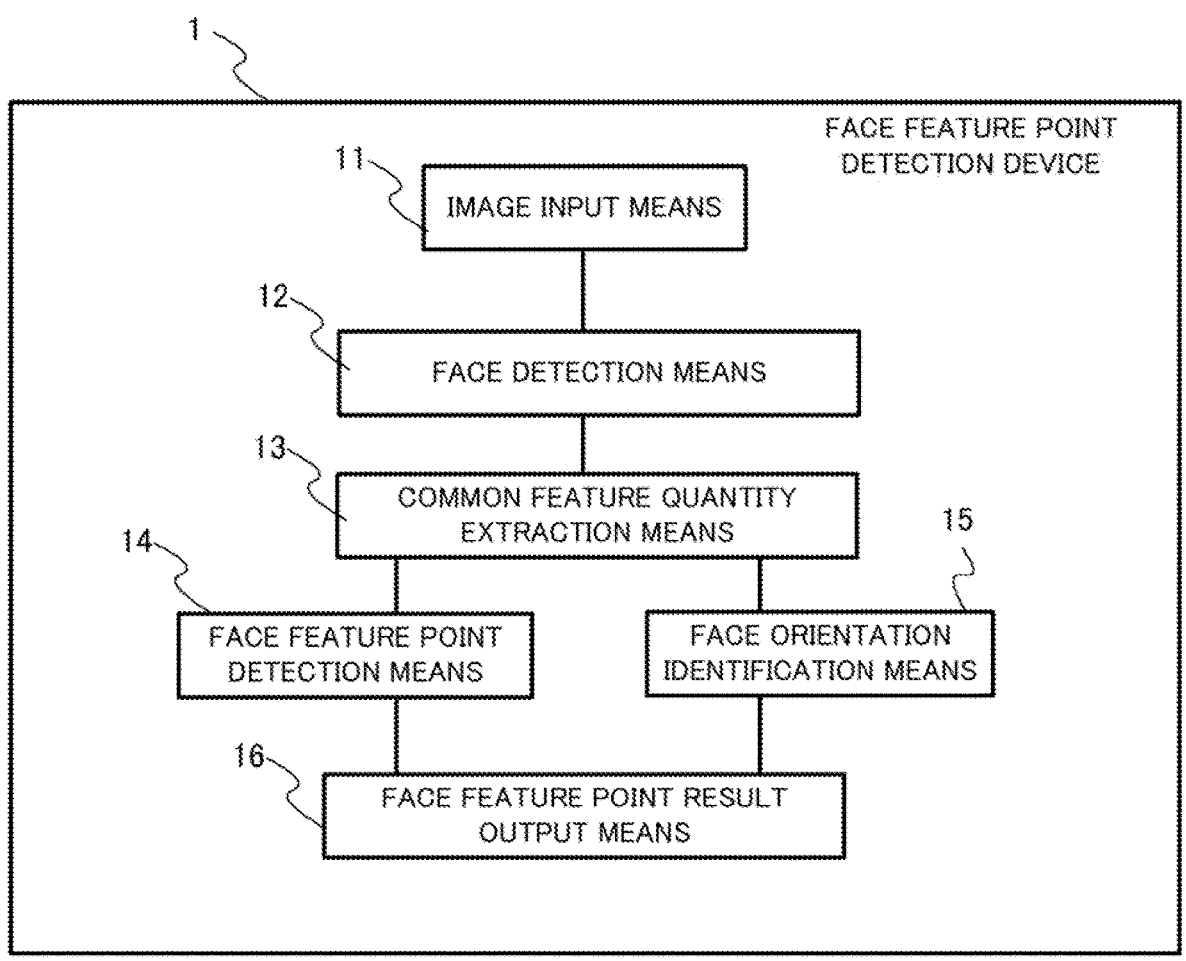
FIG. 1 is a block diagram showing a functional configuration of a face feature point detection device according to a first example embodiment.

FIG. 1 is a block diagram illustrating a functional configuration of the face feature point detection device 1 according to the first example embodiment. The face feature point detection device 1 according to the first example embodiment functionally includes an image input means 11, a face detection means 12, a common feature quantity extraction means 13, a face feature point detection means 14, a face orientation identification means 15, and a face feature point result output means 16. In FIG. 1, any blocks which exchange data with each other are connected to each other by solid line. However, the combinations of blocks which exchange data with each other are not limited to FIG. 1. The same is true of other diagrams of functional blocks to be described later.

The image input means 11 acquires an image (also referred to as a "processing target image") to be processed.

The image input means 11 acquires an image (face image) indicating at least a human face as a processing target image. The image input means 11 may receive the processing target image from an external device separate from the face feature point detection device 1 through wired or wireless communication via a network or directly, or may extract the processing target image from a memory or the like incorporated in the face feature point detection device 1. The image input means 11 supplies the acquired processing target image to the face detection means 12.

The face detection means 12 detects the face area from the processing target image acquired by the image input means 11. In this case, the face detection means 12 may perform detection of the face area using an arbitrary face detection technique. The face area may be defined, for example, by a bounding box that encloses the entire face of a person in the processing target image, and may be formed into any shape other than a rectangle. The face detection means 12 supplies information (also referred to as "face area information") indicating the detected face area to the common feature quantity extraction means 13. The face area information is, for example, an image that is a face area portion extracted from the processing target image or the normalized image thereof.

On the basis of the face area information detected by the face detection means 12, the common feature quantity extraction means 13 extracts, by a neural network learned in advance, a feature quantity (also referred to as a "common feature quantity") which is commonly used in face feature point detection for candidates of the face orientation (direction). In the first example embodiment, as an example, the candidates for the face orientation are assumed to be three types, front-facing, right-facing, and left-facing. As the face feature point detection for each candidate of the face orientation, the front-facing face feature point detection, the right-facing face feature point detection and the left-facing face feature point detection are performed.

Then, common parameters are applied to the above-described neural network in each face feature point detection. The above-described neural network is learned in advance so as to output information relating to the common feature quantity when the face area information is inputted thereto, and parameters such as weights obtained by the learning are stored to be referenceable by the common feature quantity extraction means 13. The common feature quantity extraction means 13 supplies the extracted common feature quantity to the face feature point detection means 14 and the face orientation identification means 15. Then, the face feature point detection means 14 and the face orientation identification means 15 share the common feature quantity generated by the common feature quantity extraction means 13 (that is, commonly use the common feature quantity) and execute the respective processes.

The face feature point detection means 14 performs the front-facing face feature point detection, the right-facing face feature point detection, and the left-facing face feature point detection, respectively, based on the common feature quantity extracted by the common feature quantity extraction means 13. Here, the face feature points to be detected in the front-facing face feature point detection are defined by information such as the organs of the face and the skeleton of the face, and examples thereof include the center of the pupil, the top of the head of the nose, and the like. In the right-facing face feature point detection, since the right half of the face is not visible due to the face facing to the right, the center of the pupil of the left eye, the head apex of the nose, and the like are detected as the face feature points.

Further, in the left-facing face feature point detection, since the left half of the face becomes invisible due to the face facing to the left, the center of the pupil of the right eye, the head apex of the nose, and the like are detected as the face feature points. The face feature point detection means 14 supplies the detection result of each face feature point detection to the face feature point result output means 16.

The face orientation identification means 15 identifies the orientation of the face indicated in the processing target image on the basis of the common feature quantity extracted by the common feature quantity extraction means 13. In the present example embodiment, since the candidates for the orientation of the face are three of the front-facing, right-facing, and left-facing, the face orientation identification means 15 identifies which of these three candidates is the orientation of the face indicated in the processing target image. The face orientation identification means 15, for example, is configured by a neural network. A specific configuration example and a learning method of this neural network will be described later with reference to FIGS. 10 to 12. The face orientation identification means 15 supplies the identification result of the face orientation to the face feature point result output means 16.

The face feature point result output means 16 selects the detection result of the face feature points corresponding to the orientation of the face identified by the face orientation identification means 15 from the detection results of the face feature point detection for the candidates of the face orientation outputted by the face feature point detection means 14. Then, the face feature point result output means 16 outputs information (also referred to as "face feature point information") indicating the selected face feature points.

The face feature point detection device 1 may be configured by a plurality of devices. In other words, the image input means 11, the face detection means 12, the common feature quantity extraction means 13, the face feature point detection means 14, the face orientation identification means 15, and the face feature point result output means 16 may be realized by the face feature point detection device 1 configured by a plurality of devices. In this case, the plurality of devices functioning as the face feature point detection device 1 transmits and receives information necessary for executing the pre-allocated process to other devices through wired or wireless communication via the network or directly.

(2) Processing Flow

Figure 2:
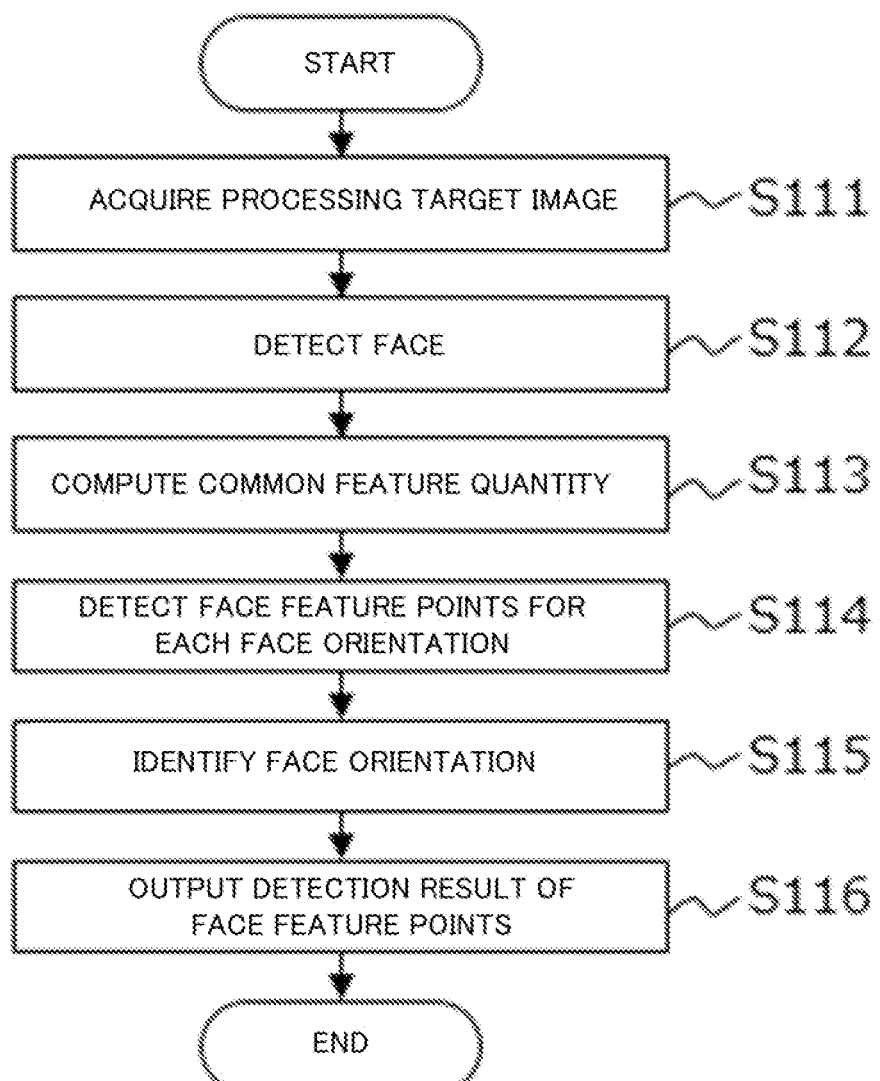
FIG. 2 is an example of a flowchart showing the procedure of the process executed by the face feature point detection device in the first example embodiment.

FIG. 2 is an example of a flowchart illustrating the procedure of the process executed by the face feature point detection device 1 according to the first example embodiment.

First, the image input means 11 of the face feature point detection device 1 acquires a face image of a person as a processing target image (step S111). Next, the face detection means 12 detects the face area on the inputted processing target image (step S112).

Next, the common feature quantity extraction means 13 computes (extracts), by the neural network, the common feature quantity (feature values) commonly used for the front facing face feature point detection, the right-facing face feature point detection, and the left-facing face feature point detection from the face area information generated by the face detection means 12 (step S113).

Next, the face feature point detection means 14 detects the face feature points for each candidate of the face orientation on the basis of the common feature quantity calculated at step S113 (step S114). Specifically, the face feature point detection means 14 performs the front-facing face feature point detection, the right-facing face feature point detection, and the left-facing face feature point detection, respectively, and detects front-facing feature points, right-facing feature points, and left-facing face feature points.

Next, the face orientation identification means 15 identifies the orientation of the face indicated in the processing target image on the basis of the common feature quantity extracted at step S113 (step S115).

Next, the face feature point result output means 16 outputs the face feature point detection result based on the processing result at step S114 and step S115 (step S116). Specifically, the face feature point result output means 16 selects the face feature points corresponding to the orientation of the face identified at step S115 among the front-facing face feature points, the right-facing face feature points, and the left-facing face feature points detected at step S114. Then, the face feature point result output means 16 outputs the face feature point information indicating the selected face feature points as the face feature point detection result.

(3) Examples

Next, an example illustrating a specific operation and configuration of the face feature point detection device 1 according to the present example embodiment will be described. First, with continued reference to FIG. 2, a specific operation performed by the face feature point detection device 1 will be described.

(3-1) Step S111

Figure 3:
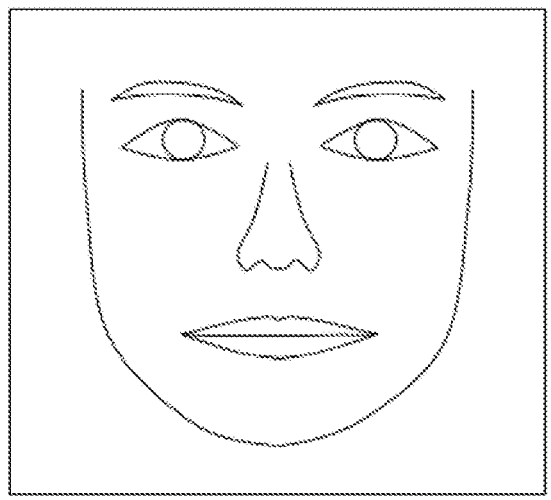
FIG. 3 illustrates an image of a face facing the front.
Figure 4:
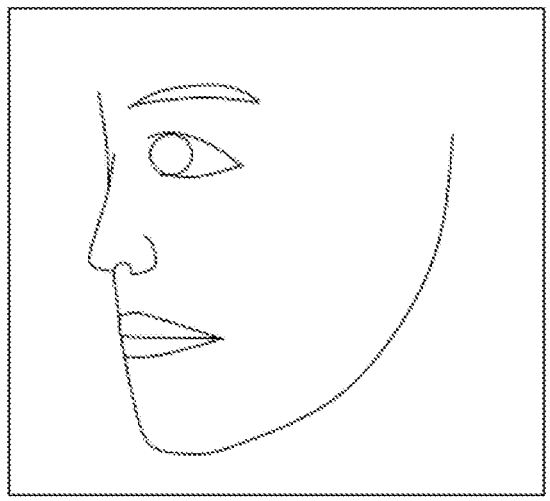
FIG. 4 illustrates an image of a face facing right.
Figure 5:
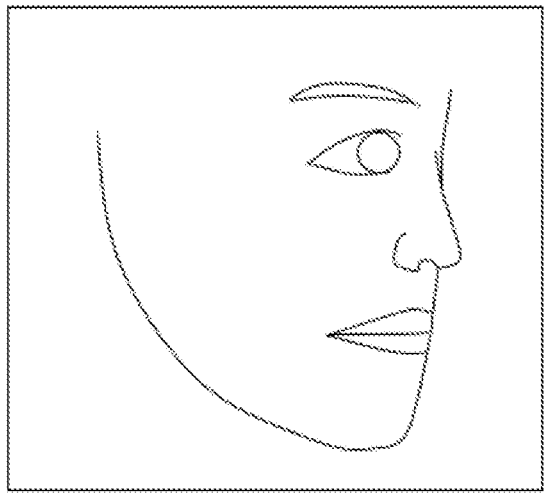
FIG. 5 illustrates an image of a face facing the left.

At step S111, the image input means 11 acquires the face image including the face of a person as a processing target image. In this example, the image input means 11 acquires either a front-facing face image, a right-facing face image, or a left-facing face image as the processing target image. FIG. 3 shows a front-facing face image. FIG. 4 shows a right-facing face image. FIG. 5 shows a left-facing face image.

(3-2) Step S112

At step S112, the face detection means 12 detects the face area from the inputted image and crops it from the processing target image as the face area image. In this case, the face detection means 12 may perform detection of the face area using a face detection method disclosed in Non-Patent Literature 4 or any other face detection methods.

(3-3) Step S113

At step S113, the common feature quantity extraction means 13 extracts the common feature quantity using a convolutional neural network with a structure from the input layer to the final hidden layer. The common feature quantity extraction means 13 uses, for example, a VGG network disclosed in Non-Patent Literature 5 as the above-described convolutional neural network. In the case of VGG network, the final hidden layer is the fully connected layer with 1000 neurons, and the feature quantity with 1000 dimensions is extracted. The common feature quantity extraction means 13 may use any convolutional neural network other than the VGG network.

(3-4) Step S114

At step S114, the face feature point detection means 14 performs the front-facing face feature point detection, the right-facing face feature point detection, and the left-facing face feature point detection based on the feature quantity extracted by the common feature quantity extraction means 13. The definition of each face feature point is determined by information such as facial organs and skeletons. Each face feature point to be detected is represented by a set of two numbers, x-coordinate and y-coordinate, which indicate the coordinates in the image (specifically, the processing target image or the face area image).

Figure 6:
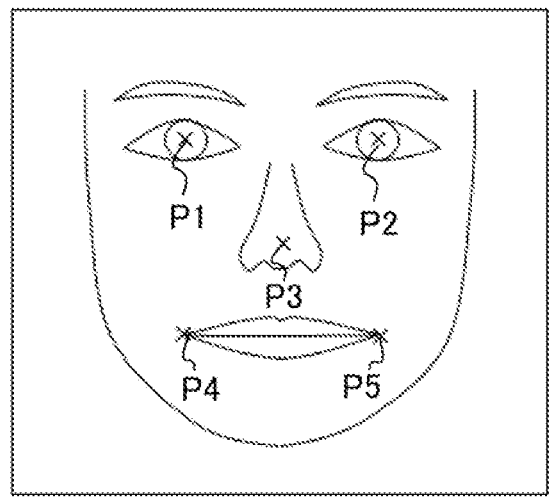
FIG. 6 illustrates front-facing face feature points over the image of the face facing the front shown in FIG. 3.

FIG. 6 illustrates front-facing face feature points over the front-facing face image shown in FIG. 3. In FIG. 6, five feature points P1 to P5 subjected to detection are indicated by x marks. Here, the feature points P1 and P2 correspond to the pupil centers of both eyes, the feature point P3 corresponds to the head apex of the nose, and the feature points P4 and P5 correspond to both corners of the mouth.

Figure 7:
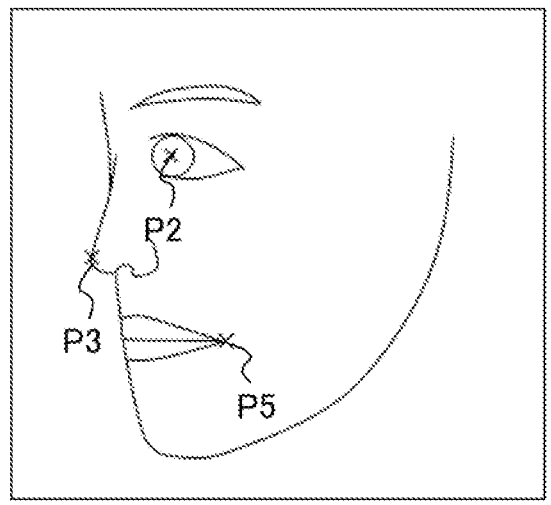
FIG. 7 illustrates right-facing face feature points over the image of the face facing the right shown in FIG. 4.

FIG. 7 illustrates right-facing face feature points over the right-facing face image shown in FIG. 4. FIG. 7 shows the three feature points P2, P3, and P5 subjected to detection are indicated by x marks. Here, the feature point P2 corresponds to the pupil center of the left eye, the feature point P3 corresponds to the head apex of the nose, and the feature point P5 corresponds to the left corner of the mouth. Among the front-facing face feature points shown in FIG. 6, the two feature points P1 and P4 corresponding to the pupil center of the right eye and the right corner of the mouth cannot be seen because the face has turned to the right, and therefore they are not used.

Figure 8:
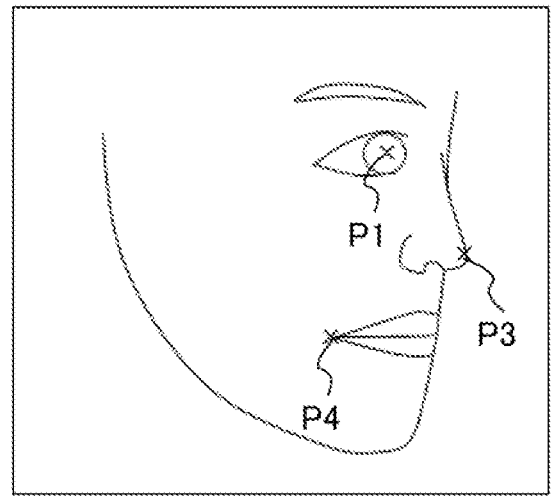
FIG. 8 illustrates left-facing face feature points over the image of the face facing the left shown in FIG. 5.

FIG. 8 illustrates left-facing face feature points over the left-facing face image shown in FIG. 5. FIG. 8 shows the three feature points P1, P3, P4 subjected to detection are indicated by x marks. Here, the feature point P1 corresponds to the pupil center of the right eye, the feature point P3 corresponds to the head apex of the nose, and the feature point P4 corresponds to the right corner of the mouth. Among the front-facing face feature points shown in FIG. 6, the two feature points P2 and P5 corresponding to the pupil center of the left eye and the left corner of the mouth are not visible because the face has turned to the left, and therefore they are not used.

When the feature points are defined as illustrated in FIGS. 6 to 8, the face feature point detection means 14 outputs ten numerical values representing x-coordinates and y-coordinates of five points as the coordinates of the five front-facing face feature points. Furthermore, the face feature point detection means 14 outputs six numerical values representing the x-coordinate and y-coordinate of three points as the coordinates of the three right-facing face feature points and outputs six numerical values representing the x-coordinate and y-coordinate of three points as the coordinates of the three left-facing face feature points. In this case, for example, the face feature point detection means 14 configures a network which accepts the output of 1000 neurons of the VGG network that functions as the common feature quantity extraction means 13, wherein a fully connected layer with 10 neurons as front-facing feature points, a fully connected layer with 6 neurons as right-facing feature points, and a fully connected layer with 6 neurons as left-facing feature points are connected in the network. A specific configuration example of the face feature point detection means 14 will be described with reference to FIG. 10 to be described later.

(3-5) Step S115

At step S115, the face orientation identification means 15 identifies the face orientation based on the feature quantity extracted by the common feature quantity extraction means 13. In this case, the face orientation identification means 15 determines the orientation of the face in the processing target image to be the candidate of the face orientation having the highest probability among the predetermined candidates of the face orientation (three candidates of the front-facing, right-facing, and left-facing in the present example embodiment). In one example, regarding the face orientation, the state of facing to the right by 45 degrees or more is defined as the right-facing, the state of facing to the left by 45 degrees or more is defined as the left-facing, and any other state is defined as front-facing.

The information on the identified orientation of the face is indicated by three neurons corresponding to the probability of each orientation of the face. In this case, for example, the face orientation identification means 15 is realized by a network which accepts the outputs of 1000 neurons extracted by the VGG network that is the common feature quantity extraction means 13 and in which the fully connected layer with three neurons and the SoftMax layer are series-connected, wherein the three neurons correspond to three candidates (front-facing, right-facing, and left-facing) of the face orientation. The above network is configured, when the output of 1000 neurons extracted by the VGG network that is the common feature quantity extraction means 13 is inputted thereto, to output the probability (degree of confidence) indicating the likelihood for each candidate of the face orientation. If 0.9 for the front-facing, 0.1 for the right-facing, and 0.0 for left-facing are outputted, the face-orientation identification means 15 determines the orientation of the face in the processing target image to be the front-facing that corresponds to the highest probability. A specific configuration example of the face orientation identification means 15 will be described with reference to FIG. 10 described later.

(3-6) Step S116

At step S116, the face feature point result output means 16 selects the face feature points corresponding to the face orientation identified by the face orientation identification means 15 from the face feature points which correspond to the three candidates of the face orientation and which are detected by the face feature point detection means 14, and outputs the face feature point information indicating the selected face feature points to the display or the like.

Instead of displaying the face feature point information on the display, the face feature point result output means 16 may supply it to another processing block in the face feature point detection device 1, or may store it in a memory (storage device) of the face feature point detection device 1 or a memory connected thereto, or may transmit it to an external device other than the face feature point detection device 1. The processing block or the external device described above may be, for example, an authentication block or an authentication device that performs face authentication for identifying a person by checking face feature point information with a database of feature points of the face of a person registered in advance. The above-described processing block is an example of an identification means for performing identification relating to a detection target based on feature information.

(3-7) Hardware Configuration of Face Feature Point Detection Device

Figure 9:
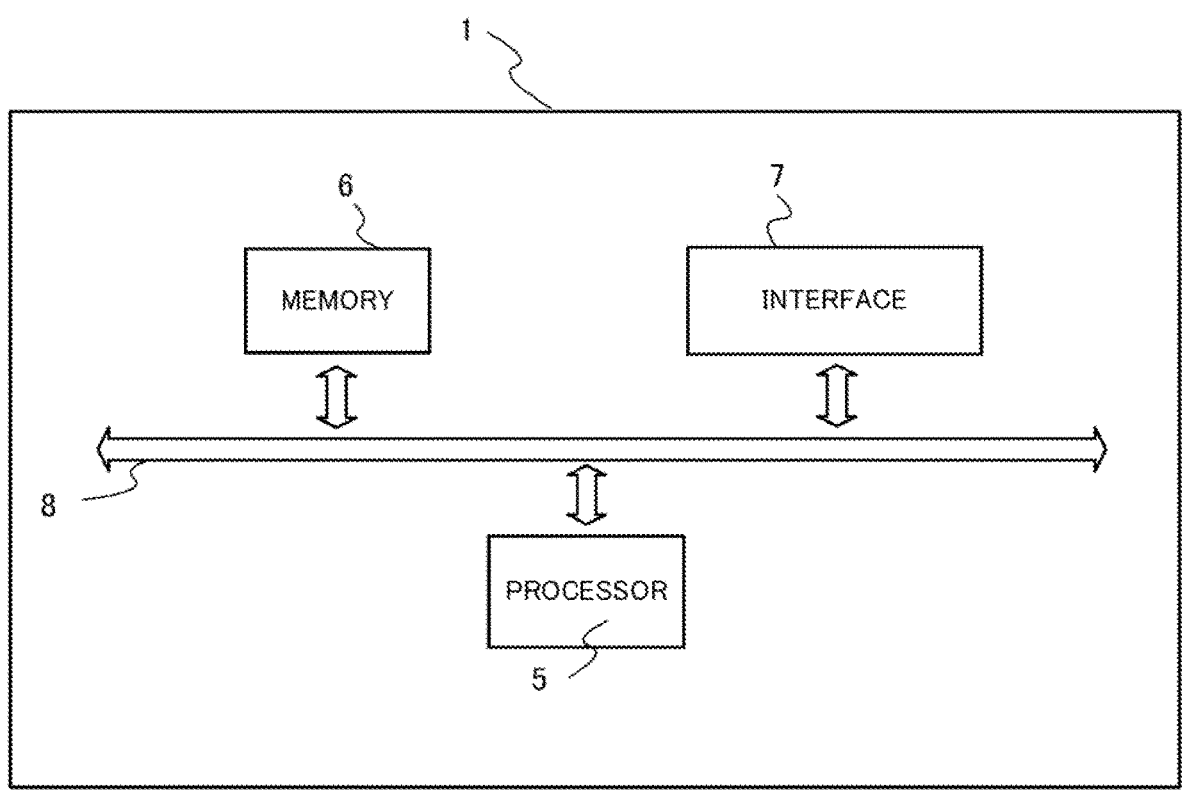
FIG. 9 is an example of a hardware configuration of the face feature point detection device.

FIG. 9 is an example of a hardware configuration of the face feature point detection device 1. The face feature point detection device 1 includes, as hardware, a processor 5, a memory 6, and an interface 7. The processor 5, the memory 6, and the interface 7 are connected to one another via a data bus 8.

The processor 5 functions as a controller (arithmetic device) that performs overall control of the face feature point detection device 1 by executing a program stored in the memory 6. Examples of the processor 5 include a CPU (Central Processing Unit), a GPU (Graphics Processing Unit), a TPU (Tensor Processing Unit), a FPGA (Field-Programmable Gate Array), an ASIC (Application Specific Integrated Circuit, and a quantum processor. The processor 5 may be configured by a plurality of processors. The processor 5 is an example of a computer.

The memory 6 is configured by various volatile memories such as a RAM (Random Access Memory) and a ROM (Read Only Memory) and nonvolatile memories. The memory 6 stores a program for executing a process executed by the face feature point detection device 1. In addition, parameters necessary to function the face detection means 12, the common feature quantity extraction means 13, the face feature point detection means 14, and the face orientation identification means 15, respectively, are stored in the memory 6. For example, the memory 6 stores parameters necessary for the common feature quantity extraction means 13 to configure the neural network. The above parameters include various parameters such as, for example, layer structure, neuron structure of each layer, number of filters and filter sizes in each layer, and weights of each element of each filter. The parameter is stored in the memory 6 after being generated by the face feature point detection device 1 or another device through machine learning. The parameters only have to be referred to by the face feature point detection device 1, and may be stored by one or more external devices (including a storage medium) other than the face feature point detection device 1.

The interface 7 is an interface for electrically connecting the face feature point detection device 1 and another device. Examples of the interface include a wireless interface, such as a network adapter for wirelessly transmitting and receiving data to and from other devices, and a hardware interface for connecting with other devices via a cable or the like.

The hardware configuration of the face feature point detection device 1 is not limited to the configuration shown in FIG. 9. For example, the face feature point detection device 1 may include at least one of an input device, a display device such as a display, and an audio output device.

Here, each component of the image input means 11, the face detection means 12, the common feature quantity extraction means 13, the face feature point detection means 14, the face orientation identification means 15, and the face feature point result outputting means 16 described in FIG. 1 can be realized, for example, by the processor 5 executing the program. In addition, the necessary program may be recorded in any non-volatile storage medium and installed as necessary to realize the respective components. In addition, at least a part of these components is not limited to being realized by software by a program, and may be realized by any combination of hardware, firmware, and software. At least some of these components may also be implemented using user-programmable integrated circuit, such as, for example, FPGA (field-programmable gate array) or microcontrollers. In this case, the integrated circuit may be used to realize the program including the above-described components. Further, at least a portion of the components may be configured by ASSP (Application Specific Standard Produce) or ASIC (Application Specific Integrated Circuit).

Thus, each of the components described above may be implemented by a variety of hardware. The same is true in other example embodiments to be described later.

(3-8) Network Configuration and Learning

Figure 10:
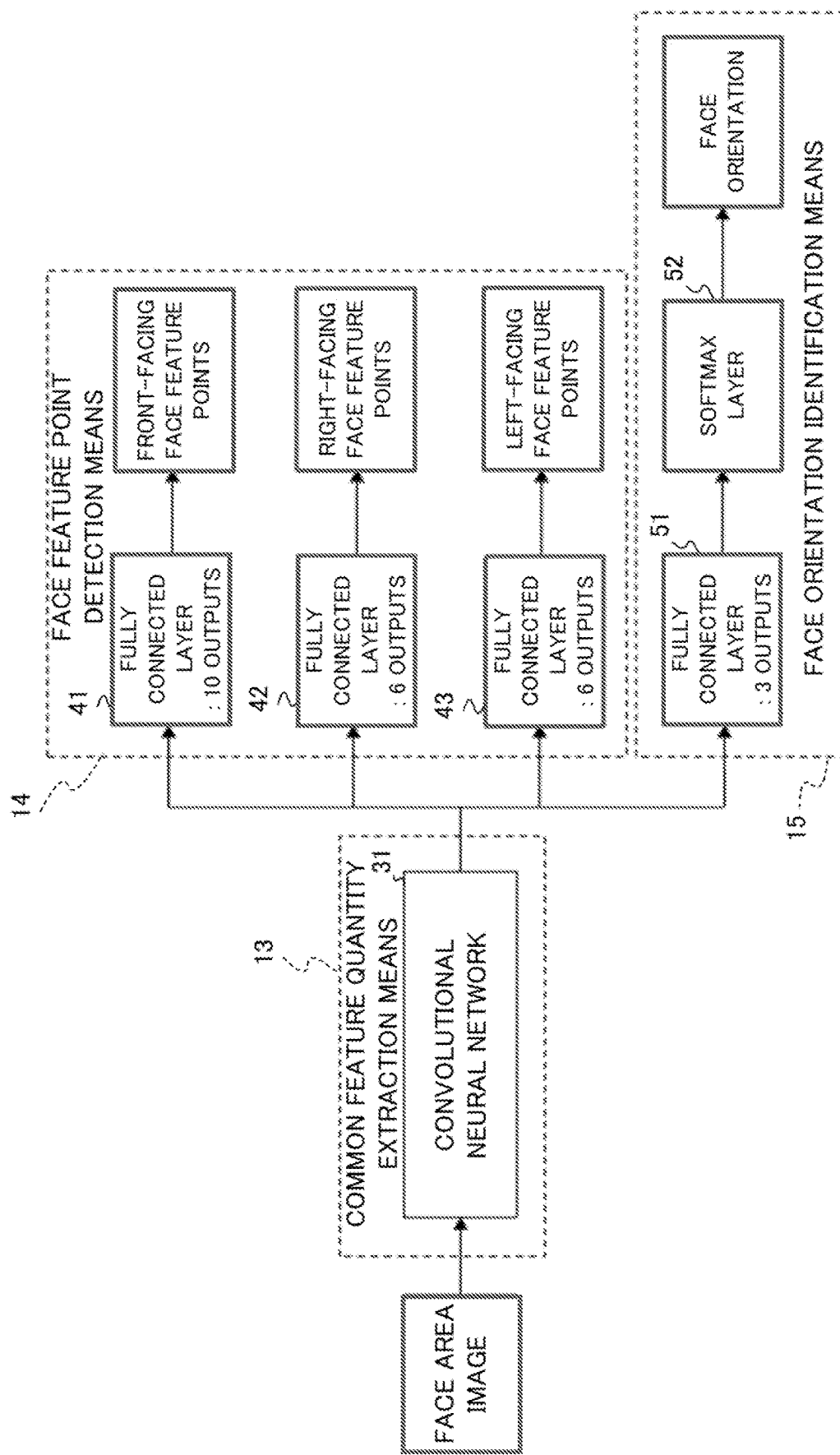
FIG. 10 is an overall configuration diagram of a network.

FIG. 10 is an overall configuration diagram of a network including the common feature quantity extraction means 13, the face feature point detection means 14, and the face orientation identification means 15 in the first example embodiment. The network illustrated in FIG. 10 includes a convolutional neural network 31 in the common feature quantity extraction means 13, fully connected layers 41 to 43 corresponding to the three candidates of the face orientation in the face feature point detection means 14, respectively, and a fully connected layer 51 and a SoftMax layer 52 in the face orientation identification means 15.

The fully connected layers 41 to 43 and the fully connected layer 51 are arranged in parallel so as to share the output of the convolutional neural network 31. The fully connected layer 41 outputs ten numerical values as the front-facing face feature points, the fully connected layer 42 outputs six numerical values as the right-facing face feature points, and the fully connected layer 43 outputs six numerical values as the left-facing face feature points. Thus, each of the fully connected layers 41 to 43 is a model (a detector of face feature points) learned to output face feature points for each candidate of the face orientation when the output result of the convolution neural network 31 is inputted thereto.

The fully connected layer 51 inputs three outputs corresponding to the three candidates for the face orientation to the SoftMax layer 52, and the SoftMax layer 52 outputs probabilities indicating likelihoods corresponding to the three candidates for the face orientation. The fully connected layer 51 is a model (discriminator of the orientation of the face) learned so as to output the identification result of the orientation of the face when the output result of the convolution neural network 31 is inputted thereto.

Figure 11:
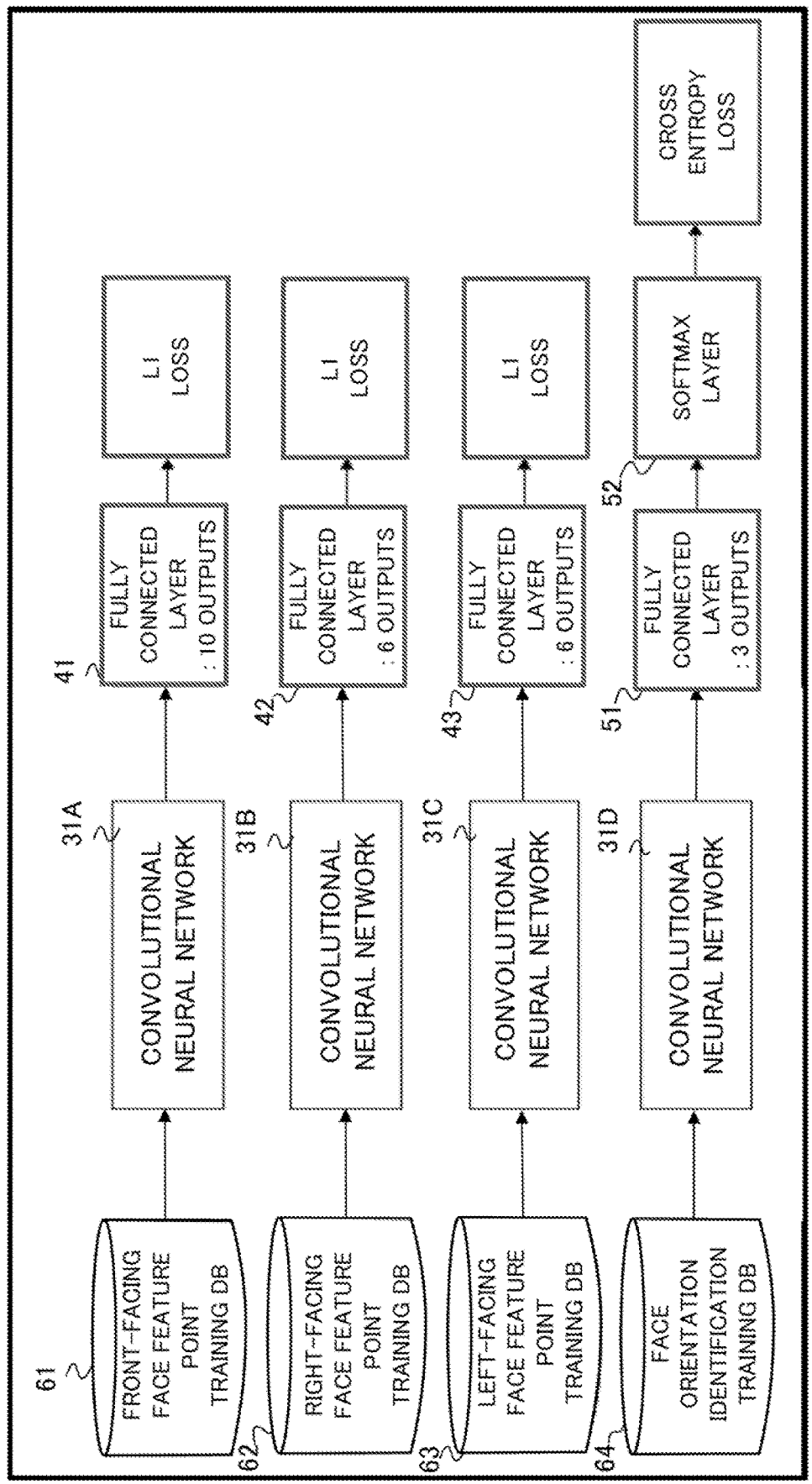
FIG. 11 is a schematic diagram of a method of learning the network shown in FIG. 10.

FIG. 11 is a schematic diagram of a learning method of the convolutional neural network 31 shown in FIG. 10. The learning of the convolution neural network 31 illustrated in FIG. 10 may be performed by the face feature point detection device 1, or may be performed by another device other than the face feature point detection device 1. Here, the convolution neural networks 31A to 31D are convolution neural networks that is temporarily generated in the process of generating the convolution neural network 31 shown in FIG. 10 by learning.

In learning, four different tasks corresponding to three face feature point detections of three candidates of the face orientation and the face orientation identification are handled, and when learning these tasks individually, it is necessary to learn four networks that is the same number as the number of tasks.

First, in the task of the front-facing face feature point detection, with reference to the front-facing face feature point training DB (Database) 61 in which combinations of the face area image and the correct answer coordinate values of the front-facing face feature points are registered, the learning of the convolutional neural network 31A and the fully connected layer 41 which are connected in series is performed. In this case, for example, the weight parameters of the convolution neural network 31A and the fully connected layer 41 are determined so as to minimize the loss (for example, L1 loss) between the ten coordinate values, which is outputted from the fully connected layer 41 in response to inputting the face area image to the convolutional neural network 31A, and the corresponding correct answer coordinate values. The algorithm to determine the parameters by minimizing the loss may be any learning algorithm used in machine learning such as the gradient descent method and the error back propagation method.

Next, in the task of the right-facing face feature point detection, with reference to the right-facing face feature point training DB 62 in which combinations of the face area image and the correct answer coordinate values of the right-facing face feature points are registered, the learning of the convolution neural network 31B and the fully connected layer 42 which are connected in series is performed. In this case, for example, the weight parameters of the convolution neural network 31B and the fully connected layer 42 are determined so as to minimize the L1 loss between the six coordinate values, which is outputted from the fully connected layer 42 in response to inputting the face area image to the convolutional neural network 31B, and the corresponding correct answer coordinate values.

Next, in the task of the left-facing face feature point detection, with reference to the left-facing face feature point training DB 63 in which combinations of the face area image and the correct answer coordinate values of the left-facing face feature points are registered, the learning of the convolution neural network 31C and fully connected layer 43 which are connected in series is performed. In this case, for example, the weight parameters of the convolution neural network 31C and the fully connected layer 43 are determined so as to minimize the L1 loss between the six coordinate values, which is outputted output from the fully connected layer 43 in response to inputting the face area image to the convolutional neural network 31C, and the corresponding correct answer coordinate values.

Next, in the task of the face orientation identification, with reference to the face orientation identification training DB 64 in which combinations of the face area image and the correct answer (correct answer label) of the face orientation are registered, the learning of the convolutional neural network 31D, the fully connected layer 51, and the SoftMax layer 52 which are connected in series in this order is performed. In this case, for example, the parameters of the convolution neural network 31D and the fully connected layer 51 and the SoftMax layer 52 are determined to minimize the loss (e.g., Cross-Entropy loss) relating to the three probabilities, which are outputted from the SoftMax layer 52 in response to inputting the face area image to the convolutional neural network 31D.

In the present example embodiment, all of the convolutional neural networks 31A to 31D used in each task have the same structure and the learning thereof is simultaneously performed using common weight parameters. Thereby, four networks that is the same number of the tasks are obtained after the learning, and the parameters of the convolutional neural network 31A to 31D are the same for all four networks. Thus, after the learning, by selecting any one of the convolutional neural networks 31A to 31D and connecting the output of the selected network to the input of the fully connected layers 41 to 43 and 51, a single network as shown in FIG. 10 can be constructed. All four tasks are tasks related to feature extraction of faces, and therefore it can be expected to acquire parameters capable of detecting face feature points with a high degree of accuracy by the effect of multitask learning by simultaneous learning. Here, the term "simultaneous learning" herein refers to performing four tasks in no particular order in order to generate the neural network 31 shown in FIG. 10, and does not necessarily require the learning of the tasks by the same timing.

Figure 12:
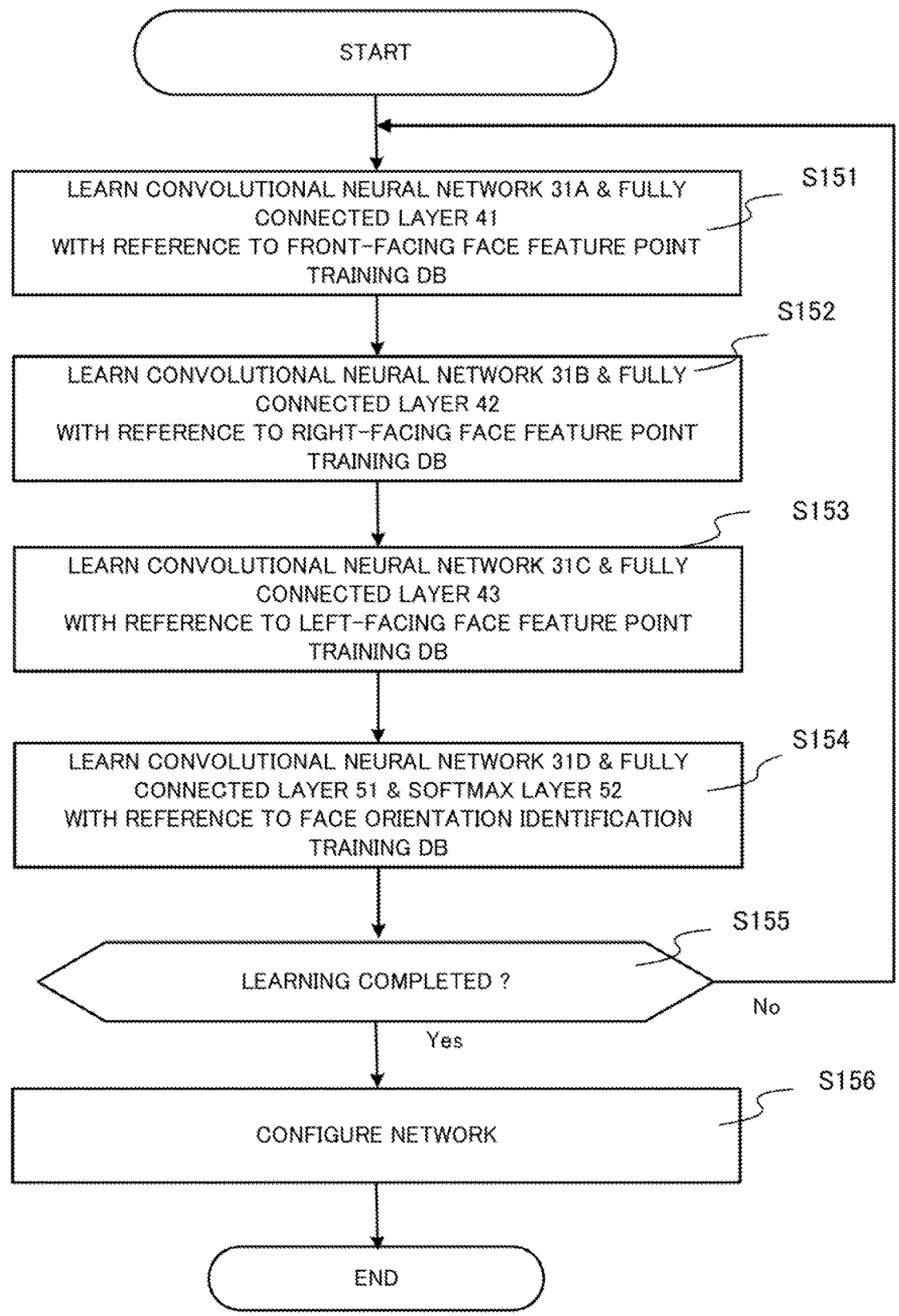
FIG. 12 is an example of a flowchart showing the procedure of the learning method shown in FIG. 11.

FIG. 12 is an example of a flowchart illustrating a procedure of learning processing by a learning device that executes the processing shown in FIG. 11. The learning device may be a face feature point detection device 1 or may be a device other than the face feature point detection device 1.

First, the learning device refers to the front-facing face feature point training DB 61 and performs the learning of the convolutional neural network 31A and the fully connected layer 41 which are connected in series (step S151). Next, the learning device refers to the right-facing face feature point training DB 62 and performs the learning of the convolutional neural network 31B and the fully connected layer 42 which are connected in series (step S152). Furthermore, the learning device refers to the left-facing face feature point training DB 63 and performs the learning of the convolutional neural network 31C and the fully connected layer 43 which are connected in series (step S153). Furthermore, the learning device refers to the face orientation identification training DB 64 and performs the learning of the convolutional neural network 31D, the fully connected layer 51, and the SoftMax layer 52 which are connected in series in this order (step S154). The processes at step S151 to the step S154 are in no particular order, and the orders may be interchanged. Further, the number of sets of the input data and the correct answer data used at step S151 to the step S154 may be one or may be a predetermined number.

Next, the learning device determines whether or not the learning has been completed (step S155). For example, when learning is performed using all the data stored in the front-facing face feature point training DB 61, the right-facing face feature point training DB 62, the left-facing face feature point training DB 63, and the face orientation identification training DB 64, the learning device determines that the learning has been completed. In another example, the learning device determines that the learning has been completed when all the losses calculated at step S151 to step S154 become equal to or less than a predetermined threshold value. In yet another example, the learning device determines that the learning has been completed when step S151 to step S154 are repeated a predetermined number of times.

Then, when it is determined that the learning has been completed (Step S155; Yes), the learning device configures the network (Step S156). Specifically, the learning device configures a single network, as shown in FIG. 10, by selecting any one of the convolutional neural networks 31A to 31D and connecting its output to the inputs of the respective fully connected layers 41 to 43, and 51. The learning device may store the parameters of the configured network in a memory or a storage device that is referred to by the face feature point detection device 1 in face feature point detection, or may transmit the parameters to the face feature point detection device 1. On the other hand, when it is determined that the learning has not been completed (step S155; No), the learning device returns the process to the step S151.

In the present example embodiment, the face feature point detection means 14 detects the face feature points for the three face orientation candidates corresponding to the front-facing, right-facing, and the left-facing. Instead, it may perform the face feature point detections for N (three or more) types of face orientation candidates. For example, the face feature point detection means 14 may perform face feature point detections for four face orientation candidates corresponding to the front-facing, the right-facing, the left-facing, and the down-facing. In this case, the face orientation identification means 15 selects the face orientation indicated in the processing target image from the N types of face orientation candidates. Then, the face feature point result output means 16 selects and outputs, from the face feature point detection results for the N types of face orientation candidates outputted by the face feature point detection means 14, the face feature point information indicating the face feature points corresponding to the face orientation selected by the face orientation identification means 15.

(4) Effect in First Example Embodiment

Next, the effect of the process performed by the face feature point detection device 1 according to the first example embodiment will be supplementally described.

Generally, there are some techniques using deep learning for face feature point detection, but they are roughly classified into two. One is a regression-based approach. The regression-based approach is an approach to output two dimensional coordinates of face feature points using an image as an input. An example of regression-based approaches is described in Non-Patent Literature 1. The other is a heat map-based approach. The heat map-based approach is an approach to output the existence probability of each feature point as a heat map using an image as an input. An example of the heat map-based approach is described in Non-Patent Literature 2.

The regression-based approach has the disadvantage that it is impossible to handle face feature points that become invisible (e.g., due to not front-facing) because the approach always outputs coordinate values. On the other hand, the heat map-based approach can treat the invisible face feature point by expressing the probability as zero. However, although the heat map-based approach outputs the same number of the heat maps as the number of the face feature points, but the regression-based approach only outputs the same number of the two-dimensional coordinate values as the number of the face feature points. Thus, the regression-based approach is smaller in scale of the network and can be executed at high speed.

Here, in face recognition and expression analysis of a person facing laterally, since the eye and the corner of the mouth on the far side from the screen become invisible, it is necessary to switch the feature points to be used between the case of a front-facing face and the case of a laterally-facing face. Then, when configuring the face feature point detectors corresponding to the plural orientations of the faces, the following issues exist.

The first issue is that the required file size and memory size increase. When configuring face feature point detectors corresponding to both frontal and lateral faces, in one plan, the face feature points for the front-facing and face feature points for the laterally-facing are separately defined and then the front-facing face feature point detector, the right-facing face feature point detector, and the left-facing face feature point detector are individually learned, thereby preparing three models. Then, before the face feature point detection processing, by using an additionally-prepared face orientation identifier for identifying the front-facing, the right-facing, and the left-facing, any one of the front-facing face feature point detector, the right-facing face feature point detector, and the left-facing face feature point detector is selected as a model to be used. That is, in this plan, a total of four types of models, one face orientation identifier and three face feature point detectors, are prepared individually. In this case, each of the face feature point detectors has a layer that performs feature quantity extraction for feature point detection, and the file size and the memory size required to individually prepare each model increase.

The second issue is that the regression-based approach does not deal with the face feature points which do not exist in the image, and it cannot learn the face feature points for the front-facing, the right-facing, and the left-facing with a single model. The regression-based approach have the advantage of being computable faster than the heat map-based approach, but feature points that are visible when facing forward but become invisible when facing sideways cannot be addressed. A method of simultaneously learning the front-facing feature point data and the laterally-facing feature point data is described in Non-Patent Literature 3. However, it is unclear which results should be selected without distinguishing between the frontal orientation and the lateral orientation.

In view of the above, according to the first example embodiment, the neural network for extracting the common feature quantity that is commonly used in face feature point detection for each candidate of the face orientation is shared, and the tasks of face feature point detection for each face orientation and the tasks of face orientation identification are simultaneously learned. Then, in the inference stage, the face feature point detection device 1 extracts the common feature quantity that is commonly used in face feature point detection for candidates of the face orientation based on the processing target image, and automatically switches the results of the face feature points according to the face orientation. Thereby, the face feature point detection device 1 can suitably perform the face feature point detection corresponding to the plural face orientations. In addition to this, the face feature point detection device 1 provides a neural network for extracting the common feature quantity, thereby suitably reducing the required memory size for storing the parameters and providing highly accurate face feature point detection by the effect of multi-task learning as compared with such a configuration in which individual feature quantity extraction is performed for each face orientation. Then, the face feature point detection according to the present example embodiment can suitably improve the accuracy of various applications such as identification of a person by face authentication using the face feature points.

Second Example Embodiment

Figure 13:
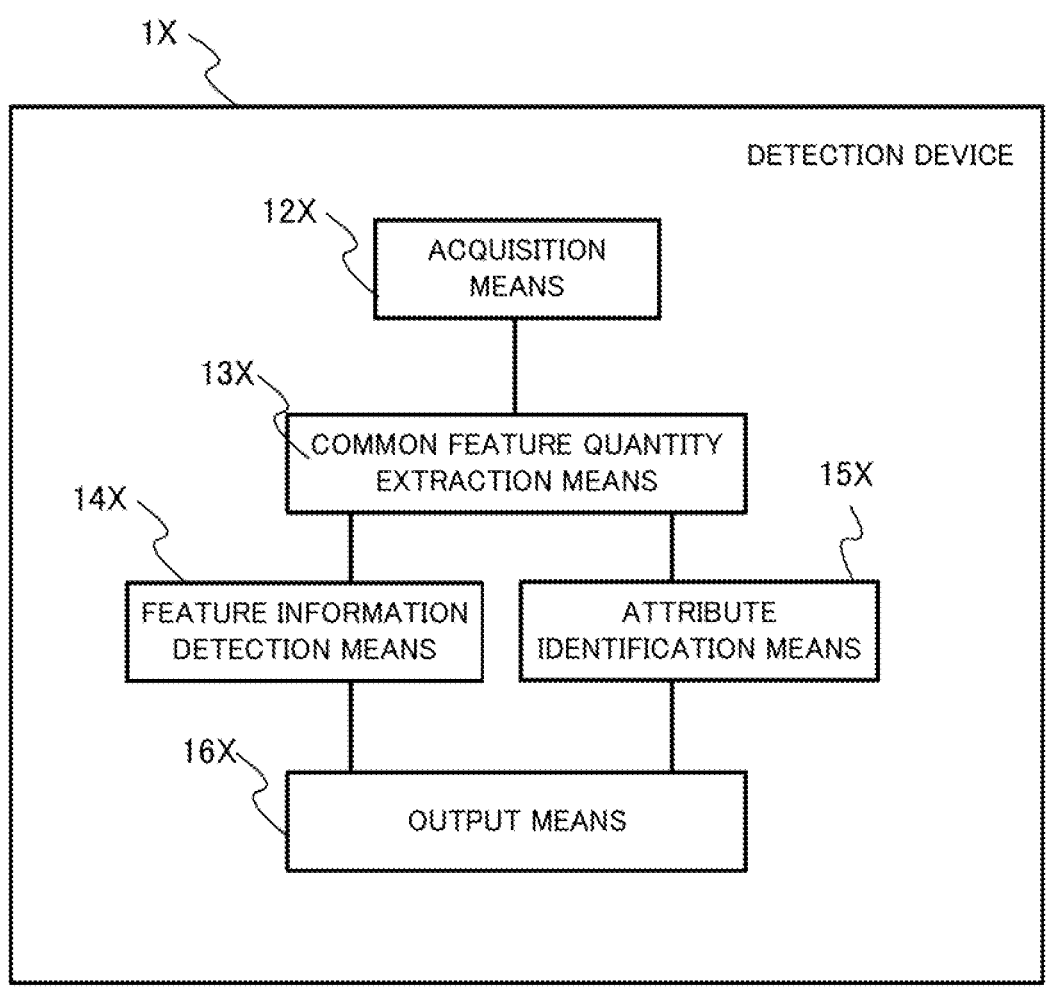
FIG. 13 is a block diagram of a detection device according to a second example embodiment.

FIG. 13 is a block diagram of a detection device 1X according to the second example embodiment. The detection device 1X mainly includes an acquisition means 12X, a common feature quantity extraction means 13X, a feature information detection means 14X, an attribute identification means 15X, and an output means 16X.

The acquisition means 12X acquires data relating to a detection target. The above-mentioned "data" is, for example, face area information in the first example embodiment. It is noted that the data is not limited to an image indicating the detection target but may be audio data indicating the sound that the detection target outputs. The term "detection target" herein refers to a target object of detection of the feature information to be described later and examples thereof include a face in the first example embodiment. The acquisition means 12X may be, for example, the face detection means 12 that generates face area information (face area image) from the processing target image in the first example embodiment. Instead of generating face area information from the processing target image, the acquisition means 12X may acquire face area information generated by another device from the processing target image.

The common feature quantity extraction means 13X extracts, from the data, common feature quantity common to plural candidates of an attribute of the detection target. The term "attribute" herein indicates a property of the detection target which appears in the data and which varies temporarily or partially depending on the time of detection, and in the first example embodiment corresponds to the face orientation. The common feature quantity extraction means 13X may be a common feature quantity extraction means 13 in the first example embodiment.

The feature information detection means 14X detects the feature information for each of the plural candidates based on the common feature quantity. The term "feature information" herein indicates information representing features of each of the plural candidates. The feature information is, for example, information indicating one or more feature points of the detection target in the image when the data is an image, and information indicating an acoustic (voice) feature quantity indicating a characteristic frequency or the like of the detection target in the audio data when the data is audio data. The feature information detection means 14X may be a face feature point detection means 14 according to the first example embodiment.

The attribute identification means 15X identifies the attribute of the detection target based on the data. In other words, on the basis of the data, the attribute identification means 15X identifies the attribute of the detection target at the time of detecting the data. The attribute identification means 15X may be a face orientation identification means 15 according to the first example embodiment.

The output means 16X outputs the feature information corresponding to the identified attribute. In other words, the output means 16X selects and outputs the feature information corresponding to the attribute identified by the attribute identification means 15X from the feature information for the plural candidates of the attribute detected by the feature information detection means 14X. In this case, the output means 16X may output the feature information to another processing block in the detection device 1X or may output the feature information to an external device. The output means 16X may be a face feature point result output means 16 in the first example embodiment.

Figure 14:
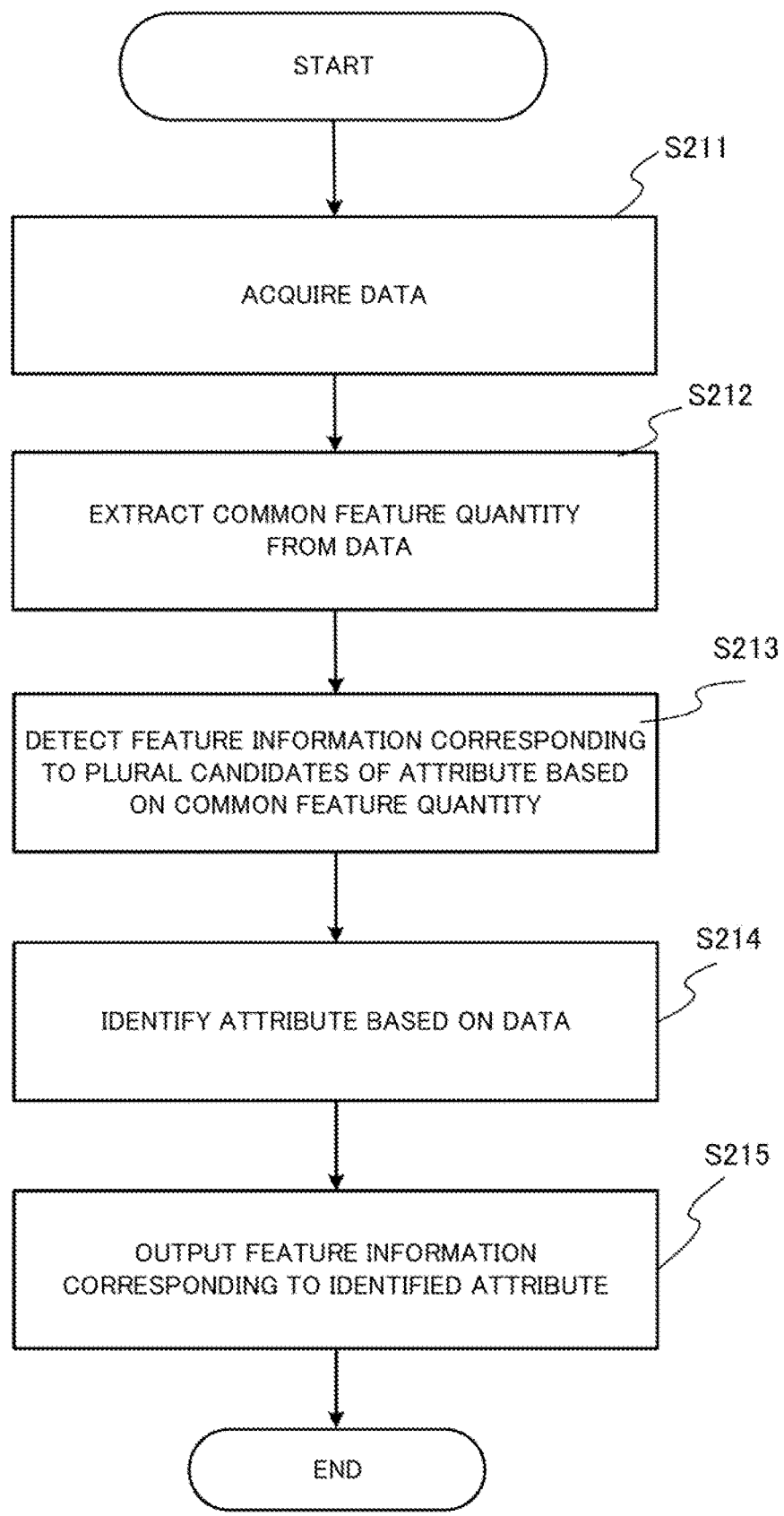
FIG. 14 is an example of a flowchart showing a processing procedure of the detection device according to the second example embodiment.

FIG. 14 is an example of a flow chart illustrating a process procedure of the detection device 1X in the second example embodiment. First, the acquisition means 12X acquires data relating to the detection target (step S211). Next, the common feature quantity extraction means 13X extracts the common feature quantity common to plural candidates of an attribute of the detection target from the data (step S212). The feature information detection means 14X detects the feature information for each of the plural candidates based on the common feature quantity (step S213). The attribute identification means 15X identifies the attribute of the detection target based on the data (step S214). The output means 16X outputs the feature information corresponding to the identified attribute (step S215). The processing order of step S213 and step S214 may be reversed, or they may be executed at the same time.

According to the second example embodiment, for such a detection target having plural candidates of the attribute, the detection device 1X can suitably detect and output the feature information according to the attribute of the detection target.

Next, a supplementary description will be given of an application example in which the detection target is an object other than a face.

In a first application, the detection device 1X may detect the feature points of the fingerprints to be used in fingerprint authentication or venous authentication. In this case, the acquisition means 12X acquires an image indicating a fingerprint or a vein as the data. The common feature quantity extraction means 13X extracts the common feature quantity common to plural candidates of the attribute (e.g., the orientation of the fingerprint or the vein) relating to the fingerprint or the vein from the image. The feature information detection means 14X detects information indicating the feature points of the fingerprint or the vein for each of the plural candidates based on the common feature quantity. The attribute identification means 15X identifies the attribute of the fingerprint or the vein indicated in the image based on the image. The output means 16X outputs information indicating the feature points of the fingerprint or the vein corresponding to the identified attribute.

In a second application, the detection device 1X may detect the acoustic (audio) feature quantity to be used in voice authentication. In this case, the acquisition means 12X acquires audio data including a human voice as the data. The common feature quantity extraction means 13X extracts common feature quantity common to plural candidates of an attribute relating to a voice (e.g., an attribute relating to a gender or age of a speaker) from the audio data. The feature information detection means 14X detects information indicating the acoustic feature quantity for each of the plural candidates based on the common feature quantity. The attribute identification means 15X identifies the attribute of the voice included in the audio data based on the audio data. The output means 16X outputs information indicating the acoustic feature quantity corresponding to the identified attribute.

In still another example, the detection device 1X may detect the feature information to be used for identification for each channel. In this case, the detection device 1X extracts the common feature quantity, detects the feature information for each channel, identifies the channel, and outputs the feature information corresponding to the identified channel in the same manner as in the first and second applications.

As described above, for any detection target having plural candidates of the attribute, the detection device 1X according to the second example embodiment can suitably detect and output the feature information according to the attribute of the detection target.

Third Example Embodiment

Figure 15:
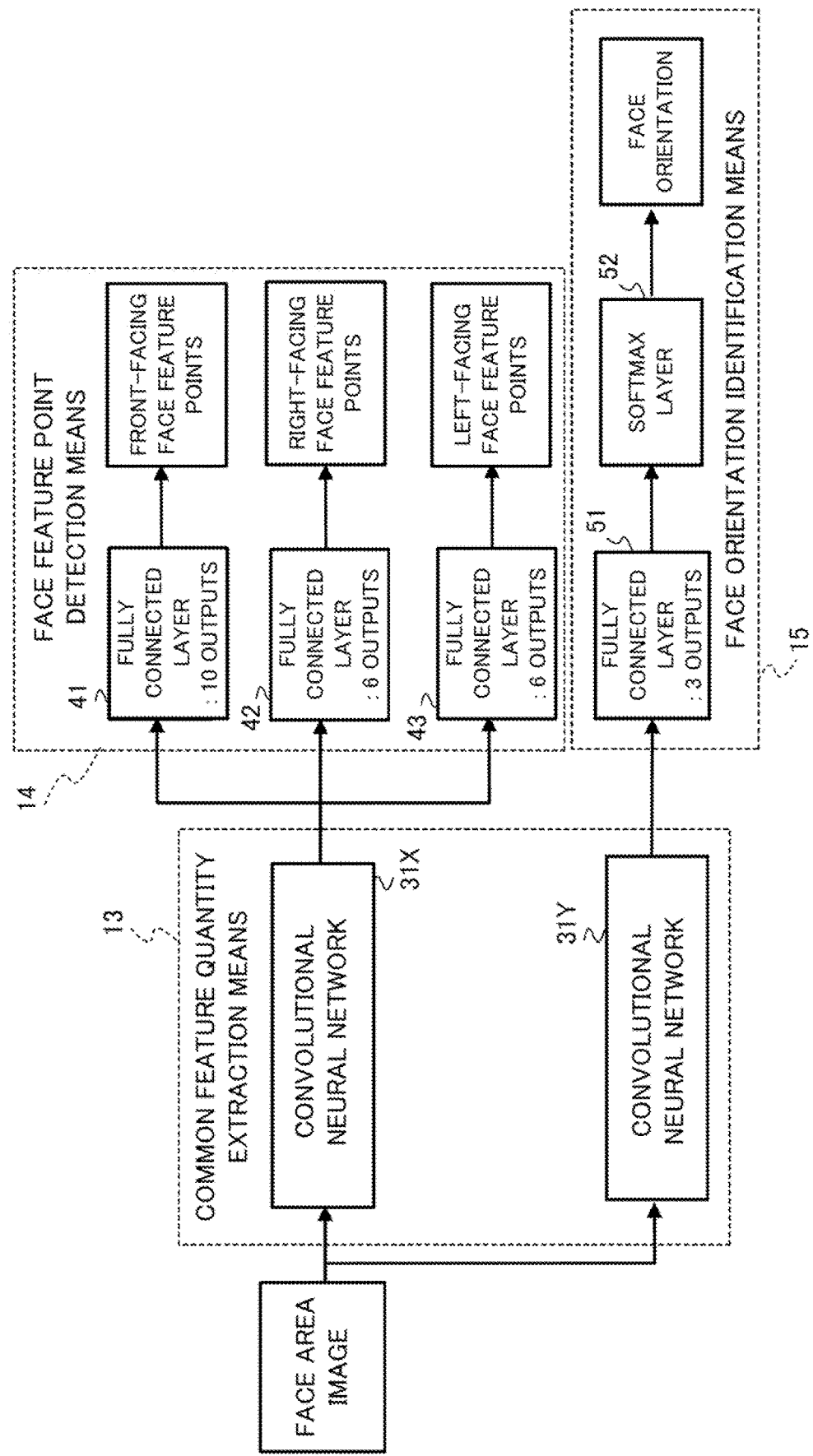
FIG. 15 is a configuration diagram relating to a common feature quantity extraction means, a face feature point detection means, and a face orientation identification means of the face feature point detection device according to the third example embodiment.

FIG. 15 is a configuration diagram relating to the common feature quantity extraction means 13, the face feature point detection means 14, and the face orientation identification means 15 of the face feature point detection device 1A according to the third example embodiment. In the third example embodiment, the common feature quantity extraction means 13 differs from the one in the first example embodiment in that, instead of including a single convolutional neural network 31, it includes a convolutional neural network 31X connected to the face feature point detection means 14 and a convolutional neural network 31Y connected to the face orientation identification means 15, respectively. Hereinafter, the same components as in the first example embodiment are appropriately denoted by the same reference numerals, and description thereof will be omitted.

The convolution neural network 31X is an example of the "first neural network", and the convolution neural network 31Y is an example of the "second neural network".

The convolutional neural network 31X is learned so as to infer the common feature quantity to be commonly used for face feature point detections for the front-facing, the right-facing, and the left-facing when the face area image is inputted thereto. The convolutional neural network 31X supplies the inferred common feature quantity to the fully connected layers 41 to 43 in the face feature point detection means 14, respectively. Further, the convolutional neural network 31Y is learned so as to infer the feature quantity (also referred to as "face orientation identification feature quantity") to be used for identification of the face orientation when the face area image is inputted thereto. The convolutional neural network 31Y supplies the inferred face orientation identification feature quantity to the fully connected layer 51 in the facial orientation identification means 15.

Here, the learning of the convolutional neural networks 31X and 31Y will be described with reference again to FIGS. 11 and 12.

In the learning of the convolutional neural network 31X, the learning device performs the learning at step S151 to step S153 by making the weights of the convolutional neural networks 31A to 31C shown in FIG. 11 to be common. That is, the structures of all the convolutional neural networks 31A to 31C used at step S151 to step S153 are the same, and simultaneous learning is performed with common weights. Then, in the process of configuring the network at step S156 after the determination that the learning has been completed at step S155, the learning device selects any one of the convolutional neural networks 31A to 31C as the convolution neural network 31X and connects the output of the selected network and the input of each fully connected layers 41 to 43 (see FIG. 15).

In the learning of the convolutional neural network 31Y, the learning device carries out the learning at step S154 using the neural network 31D which does not share the weight with the neural networks 31A to 31C. In this case, the structure of the neural network 31D may be the same as the structure of the neural networks 31A to 31C or may be different. In this case, in the learning at step S154, the learning of the neural network 31D is performed without sharing the weights with the convolution neural networks 31A to 31C used for the learning of the face feature point detection means 14. Thus, the learning of the neural network 31D is performed so as to output the face orientation identification feature quantity specialized for the face orientation identification. Then, when configuring the network at step S156 after the determination that the learning has been completed at step S155, the learning device uses the convolution neural network 31D as a convolution neural network 31Y and connects the output thereof and the input of the fully connected layer 51 (see FIG. 15).

As described above, according to the third example embodiment, the face feature point detection device 1A can extract the common feature quantity commonly used for detecting the face feature points for the front-facing, right-facing, and left-facing by one convolutional neural network 31X. Further, the face feature point detection device 1A can extract the face orientation identification feature quantity suitable for the face orientation identification by the convolution neural network 31Y.

Fourth Example Embodiment

Figure 16:
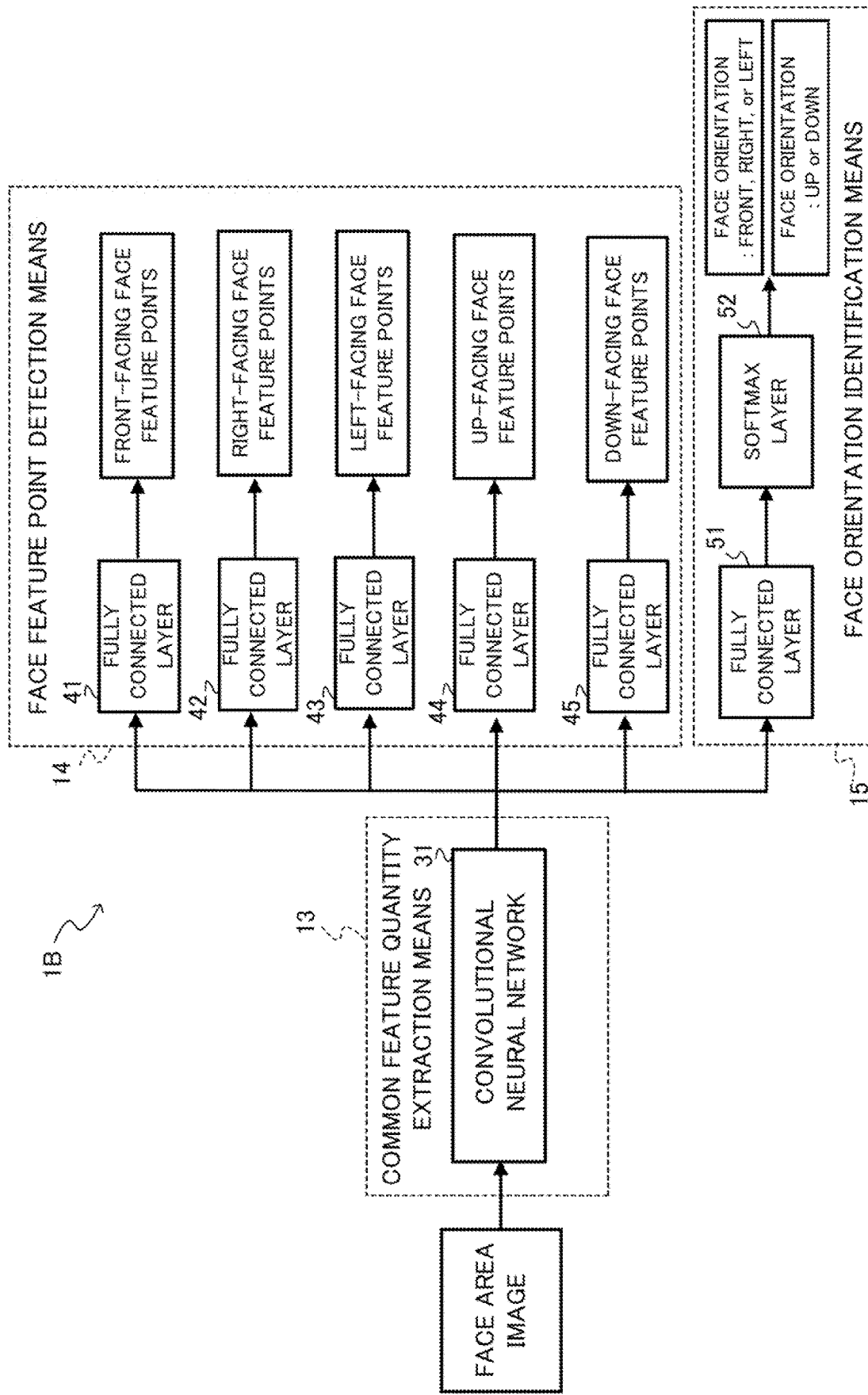
FIG. 16 is a configuration diagram relating to a common feature quantity extraction means, a face feature point detection means, and a face orientation identification means of the face feature point detection device according to a fourth example embodiment.

FIG. 16 is a configuration diagram relating to the common feature quantity extraction means 13, the face feature point detection means 14, and the face orientation identification means 15 of the face feature point detection device 1B according to the fourth example embodiment. In the fourth example embodiment, the face-orientation identification means 15 differs from the one in the first example embodiment in that it outputs, as an identification result, a set of any candidate selected from (front-facing, right-facing, left-facing) and any candidate selected from (up-facing, down-facing). The same components as in the first example embodiment are appropriately denoted by the same reference numerals, and description thereof will be omitted. Hereafter, for convenience, three candidates (front-facing, right-facing, left-facing) of the face orientation are defined as the first group of candidates of the face orientation, and two candidates (up-facing, down-facing) of the face orientation are defined as the second group of candidates of the face orientation.

In this case, as shown in FIG. 16, the face feature point detection means 14 includes not only the fully connected layers 41 to 43 described in the first example embodiment but also the fully connected layer 44 and the fully connected layer 45. Then, all the fully connected layers 41 to 45 and the fully connected layer 51 are arranged in parallel so as to share the output of the convolutional neural network 31. Here, the fully connected layer 44 is configured to output, when the common feature quantity outputted from the convolution neural network 31 is inputted thereto, a numerical value corresponding to a predetermined number of the coordinate values as up-facing face feature points. The fully connected layer 45 is configured to output, when the common feature quantity outputted from the convolution neural network 31 is inputted thereto, a numerical value corresponding to a predetermined number of the coordinate values as down-facing face feature points.

Further, the face orientation identification means 15 outputs a set of any of (front-facing, right-facing, left-facing) belonging to the first group of the candidates of the face orientation and any of (up-facing, down-facing) belonging to the second group of the candidates of the face orientation as an identification result. In this case, for example, the face-orientation identification means 15 outputs as the identification result a set of the candidate with the highest probability (confidence degree) outputted by the SoftMax layer 52 among the first group (front-facing, right-facing, left-facing) and the candidate with the highest probability outputted by the SoftMax layer 52 among the second group (up-facing, down-facing). The face-orientation identification means 15 may include, as the SoftMax layer 52, a SoftMax layer for outputting probabilities corresponding to the first group (front-facing, right-facing, left-facing) and a SoftMax layer for outputting probabilities corresponding to the second group (up-facing, down-facing). Thereafter, the face feature point result output means 16 outputs the face feature point information indicating the face feature points corresponding to the two face orientations outputted from the face orientation identification means 15 as the identification result.

Figure 17:
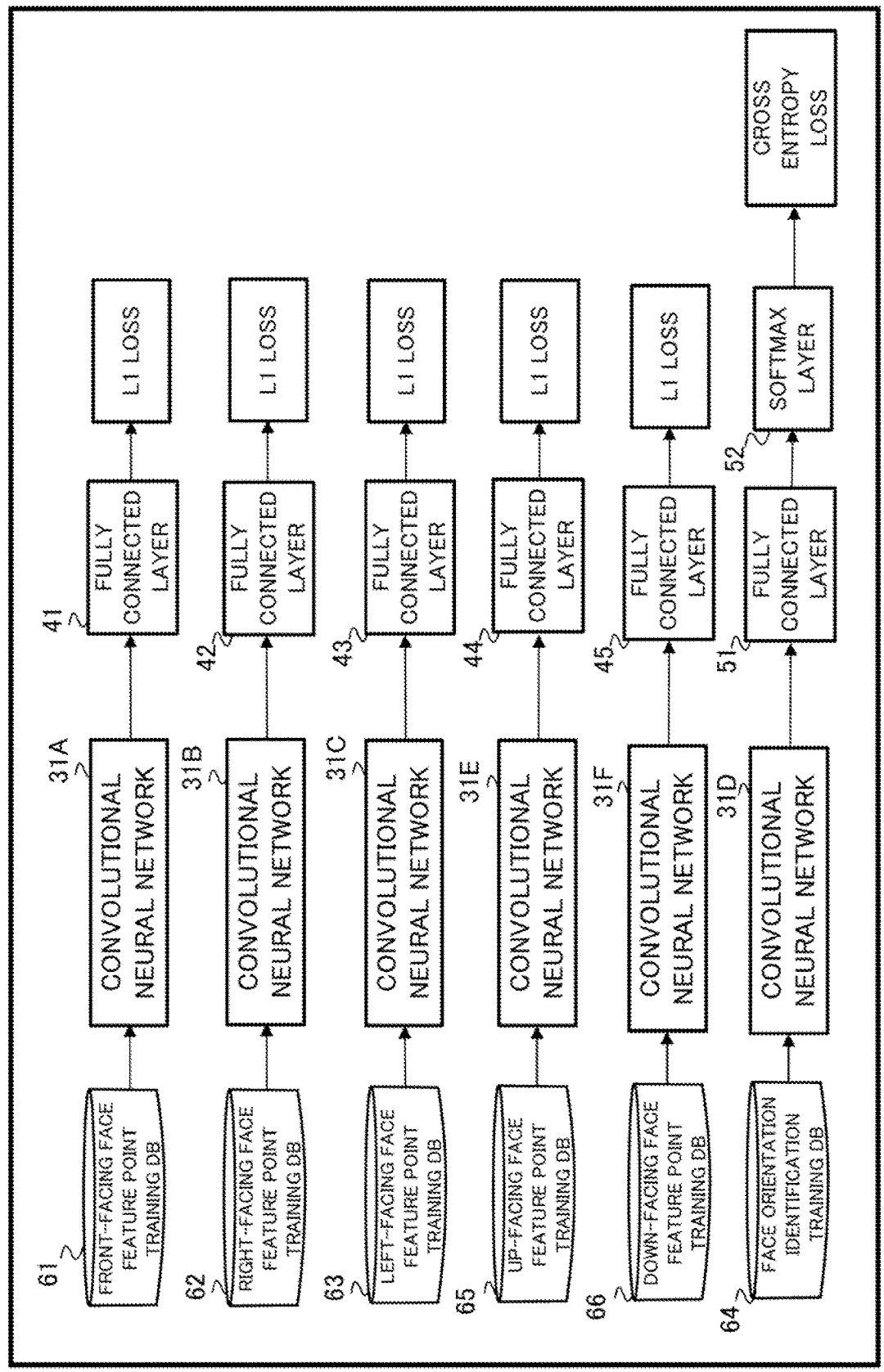
FIG. 17 is a schematic diagram of a method of learning a face common feature quantity extraction means, a face feature point detection means, and a face orientation identification means according to the fourth example embodiment.

FIG. 17 is a schematic diagram of a learning method of the common feature quantity extraction means 13, the face feature point detection means 14, and the face orientation identification means 15 illustrated in FIG. 16. In learning, six different tasks corresponding to face feature point detections for five candidates and a face orientation identification, respectively, are handled, and the weights of the convolutional neural networks 31A to 31F to be used in each task are learned as common parameters.

Here, in the fourth example embodiment, in addition to the four tasks described in the first example embodiment, the learning device performs a task of the up-facing face feature point detection and a task of the down-facing face feature point detection. In the task of the up-facing face feature point detection, with reference to the up-facing face feature point training DB 65 in which combinations of the face area image and the correct answer coordinate values of the up-facing face feature points are registered, the learning of the convolution neural network 31E and the fully connected layer 44 which are connected in series is performed. In this case, for example, the weight parameters of the convolution neural network 31E and the fully connected layer 44 are determined to minimize the L1 loss between the coordinate values, which is outputted from fully connected layer 44 in response to inputting the face area image to the convolutional neural network 31E, and the corresponding correct answer coordinate values. In the task of the down-facing face feature point detection, with reference to the down-facing face feature point training DB 66 in which combinations of the face area image and the correct answer coordinate values of the down-facing face feature points are registered, the learning of the convolution neural network 31F and the fully connected layer 45 which are connected in series is performed. In this case, for example, the weight parameters of the convolutional neural network 31F and the fully connected layer 45 are determined to minimize L1 loss between the coordinate values, which is outputted from the fully connected layers 45 in response to inputting the face area image to the convolutional neural network 31F, and the corresponding correct answer coordinate values.

Figure 18:
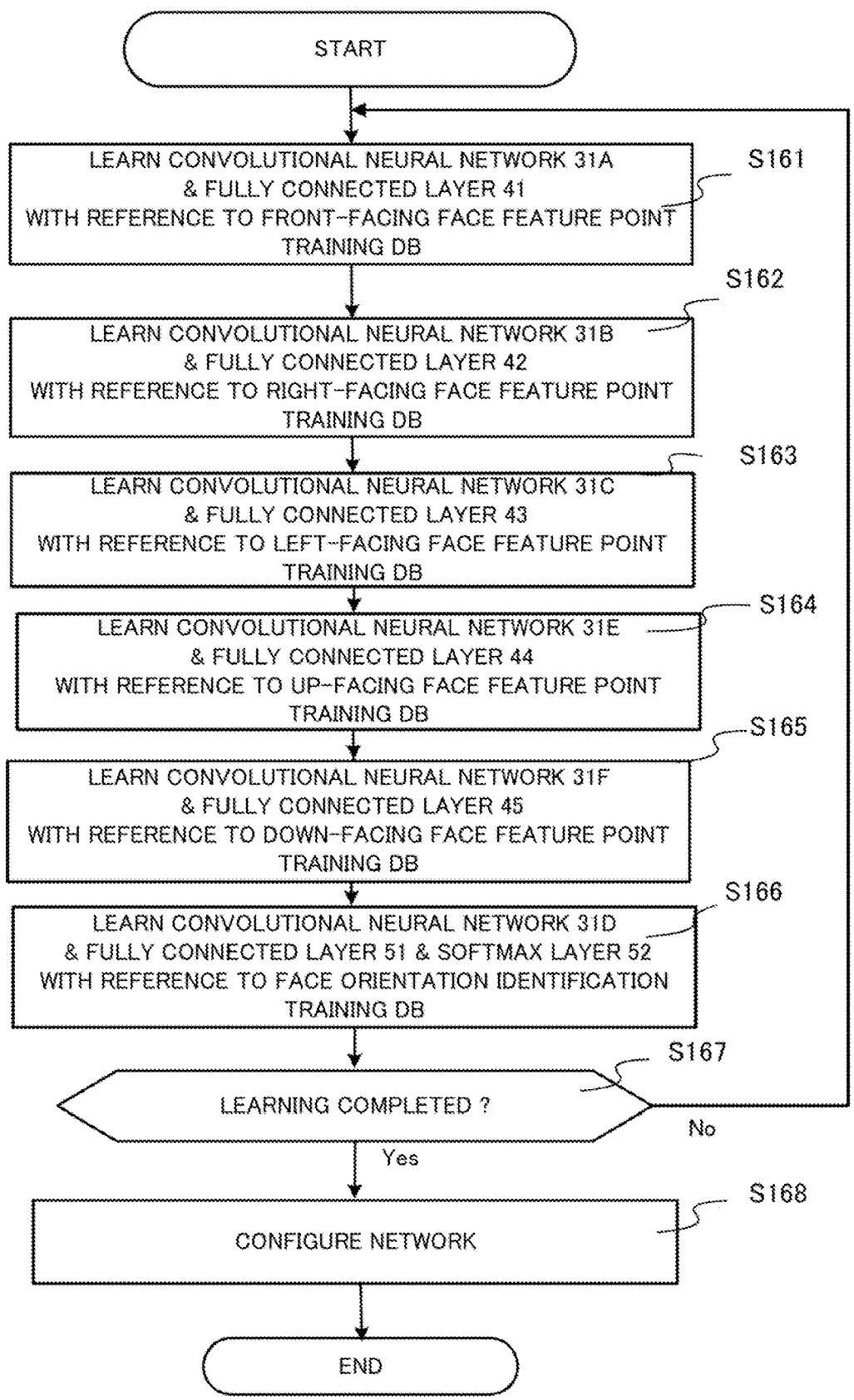
FIG. 18 is an example of a flowchart showing a procedure of learning processing by the learning device according to the fourth example embodiment.

FIG. 18 is an example of a flowchart illustrating a procedure of learning processing by a learning device that executes the processing shown in FIG. 17.

First, the learning device refers to the front-facing face feature point training DB 61 and performs the learning of the convolutional neural network 31A and the fully connected layer 41 which are connected in series (step S161). Next, the learning device refers to the right-facing face feature point training DB 62 and performs the learning of the convolutional neural network 31B and the fully connected layer 42 which are connected in series (step S162). Furthermore, the learning device refers to the left-facing face feature point training DB 63 and performs the learning of the convolutional neural network 31C and the fully connected layer 43 which are connected in series (step S163). Furthermore, the learning device refers to the up-facing face feature point training DB 65 and performs the learning of the convolutional neural network 31E and the fully connected layer 44 which are connected in series (step S164). Furthermore, the learning device refers to the down-facing face feature point training DB 66, and performs the learning of the convolution neural network 31F and the fully connected layer 45 which are connected in series (step S165). Furthermore, the learning device refers to the face orientation identification training DB 64 and performs the learning of the convolutional neural network 31D, the fully connected layer 51, and the SoftMax layer 52 which are connected in series in this order (step S166). The processes at step S161 to the step S166 are in no particular order, and the orders may be interchanged. Further, the number of sets of the input data and the correct answer data used at step S161 to the step S166 may be one or may be a predetermined number.

Next, the learning device determines whether or not the learning has been completed (step S167). For example, when learning is performed using all the data stored in the front-facing face feature point training DB 61, the right-facing face feature point training DB 62, the left-facing face feature point training DB 63, the face orientation identification training DB 64, the up-facing face feature point training DB 65, and the down-facing face feature point training DB 66, the learning device determines that the learning has been completed. In another example, the learning device determines that the learning has been completed when all the losses calculated at step S161 to step S166 become equal to or less than a predetermined threshold value. In yet another example, the learning device determines that the learning has been completed when step S161 to step S166 are repeated a predetermined number of times.

Then, when it is determined that the learning has been completed (Step S167; Yes), the learning device configures the network (Step S168). Specifically, the learning device configures a single network, as shown in FIG. 16, by selecting any one of the convolutional neural networks 31A to 31E and connecting its outputs to the input of the respective fully connected layers 41 to 45 and 51. On the other hand, the learning device returns the process to the step S161 when it is determined that the learning has not been completed (step S167; No).

The common feature quantity extraction means 13 according to the fourth example embodiment, as with the third example embodiment, may have a convolution neural network that outputs common feature quantity to the face feature point detection means 14 and a convolution neural network that outputs face orientation identification feature quantity to the face orientation identification means 15, respectively.

According to the fourth example embodiment, the face feature point detection device 1 can suitably determine not only whether the detected face is facing forward, right, or left, but also whether it is facing upward or downward. It is noted that the number of groups is not limited to the two described above, candidates of the attribute of the detection target may be divided into any number of groups according to the detection target. In this case, the attribute of the detection target is identified for each group.

Fifth Example Embodiment

FIG. 19 is a block diagram illustrating a functional configuration of a face feature point detection device 1C according to the fifth example embodiment. The face feature point detection device 1C differs from the face feature point detection device 1 in the first example embodiment in that each training DB to be used for learning of the convolution neural network 31 and the like is updated. Hereinafter, the same components as in the first example embodiment are appropriately denoted by the same reference numerals, and description thereof will be omitted. The fifth example embodiment may be combined with the third example embodiment or/and the fourth example embodiment.

The face feature point result output means 16 updates one of the face feature point training DB 61 to 63 and the face orientation identification training DB 64 based on the detection result of the face feature points outputted by the face feature point detection means 14 and the face orientation identification result outputted by the face orientation identification means 15 when the image input means 11 acquires the processing target image. Specifically, the face feature point result output means 16 uses, as sets of input data and correct answer data, sets of the face area image outputted by the face detection means 12 and the face feature point coordinates corresponding to the face orientation identified by the face orientation identification means 15, and then registers the above sets in one of the face feature point training DB 61 to 63 corresponding to the face orientation identified by the face orientation identification means 15. Further, the face feature point result outputting means 16 registers sets of the face area image outputted by the face detection means 12 and the label (tag) indicating the face orientation identified by the face orientation identification means 15 as sets of input data and correct answer data in the face orientation identification training DB 64. Thereafter, the data registered in the face feature point training DB 61 to 63 and the face orientation identification training DB 64 are suitably used in the learning of the convolutional neural network 31 and the like described in FIG. 11.

As described above, in the fifth example embodiment, the face feature point detection device 1C can suitably generate the training data for learning the convolution neural network 31 according to the processing result of the processing target image and update the training DB.

In the example embodiments described above, the program is stored by any type of a non-transitory computer-readable medium (non-transitory computer readable medium) and can be supplied to a control unit or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments described above (including modifications, the same applies hereinafter) can be described as, but not limited to, the following Supplementary Notes.

Supplementary Note 1

A detection device comprising:
an acquisition means for acquiring data relating to a detection target;
a common feature quantity extraction means for extracting, from the data, common feature quantity common to plural candidates of an attribute of the detection target;
a feature information detection means for detecting feature information of the detection target for each of the plural candidates based on the common feature quantity;
an attribute identification means for identifying the attribute based on the data; and
an output means for outputting the feature information corresponding to the identified attribute.

Supplementary Note 2

The detection device according to Supplementary Note 1, wherein the common feature quantity extraction means generates the common feature quantity based on a neural network learned to output information relating to the common feature quantity when the data is inputted thereto.

Supplementary Note 3

The detection device according to Supplementary Note 2, wherein the feature information detection means and the attribute identification means execute respective processes based on a common output result outputted from the neural network configured by common parameters.

Supplementary Note 4

The detection device according to Supplementary Note 2 or 3,
wherein the feature information detection means detects the feature information for each of the plural candidates based on a detector, the detector being learned with respect to each of the plural candidates to output the feature information when an output result of the neural network is inputted thereto, and
wherein the attribute identification means identifies the attribute based on an identifier, the identifier being learned to output an identification result of the attribute when the output result of the neural network is inputted thereto.

Supplementary Note 5

The detection device according to Supplementary Note 4, wherein the detector for each of the plural candidates and the identifier are learned by sharing parameters of the neural network.

Supplementary Note 6

The detection device according to Supplementary Note 1 or 2,
wherein the common feature quantity extraction means includes:
a first neural network that is a neural network learned to output information relating to the common feature quantity when the data is inputted thereto; and
a second neural network that is a neural network learned to output feature quantity to be inputted to the attribute identification means when the data is inputted thereto.

Supplementary Note 7

The detection device according to Supplementary Note 6, wherein the feature information detection means detects the feature information for each of the plural candidates based on a detector, the detector being learned with respect to each of the plural candidates to output the feature information when an output result of the first neural network is inputted thereto, and
wherein the detector for each of the plural candidates are learned by sharing parameters of the first neural network.

Supplementary Note 8

The detection device according to any one of Supplementary Notes 2 to 7,
wherein the output means generates training data of the neural network based on the feature information corresponding to the identified attribute.

Supplementary Note 9

The detection device according to any one of Supplementary Notes 1 to 8,
wherein the plural candidates are divided into plural groups, and
wherein the attribute identification means identifies the attribute for each of the plural groups.

Supplementary Note 10

The detection device according to any one of Supplementary Notes 1 to 9, further comprising
an identification means for performing identification relating to the detection target based on the feature information.

Supplementary Note 11

The detection device according to any one of Supplementary Notes 1 to 10,
wherein the data is an image indicating a face of a person that is the detection target,
wherein the attribute is an orientation of the face in the image,
wherein the common feature quantity extraction means generates, on a basis of the image, the common feature quantity common to the plural candidates of the orientation of the face,
wherein the feature information detection means detects, as the feature information, one or more feature points of the face in the image for each of the plural candidates, based on the common feature quantity,
wherein the attribute identification means identifies, on a basis of the image, the orientation of the face in the image, and
wherein the output means outputs the feature points corresponding to the identified orientation of the face.

Supplementary Note 12

The detection device according to any one of Supplementary Notes 1 to 10,
wherein the data is an image indicating a fingerprint or a vein,
wherein the common feature quantity extraction means generates, on a basis of the image, the common feature quantity common to the plural candidates of the attribute of the fingerprint or the vein,
wherein the feature information detection means detects, as the feature information, one or more feature points of the fingerprint or the vein in the image for each of the plural candidates, based on the common feature quantity,
wherein the attribute identification means identifies the attribute based on the image, and
wherein the output means outputs the feature points corresponding to the identified attribute.

Supplementary Note 13

The detection device according to any one of Supplementary Notes 1 to 10,
wherein the data is audio data including a voice,
wherein the common feature quantity extraction means generates, on a basis of the audio data, the common feature quantity common to the plural candidates of the attribute of the voice,
wherein the feature information detection means detects, as the feature information, feature quantity of the voice for each of the plural candidates, based on the common feature quantity,
wherein the attribute identification means identifies the attribute of the voice based on the audio data, and
wherein the output means outputs the feature quantity corresponding to the identified attribute of the voice.

Supplementary Note 14

A detection method executed by a computer, comprising:
acquiring data relating to a detection target;
extracting, from the data, common feature quantity common to plural candidates of an attribute of the detection target;
detecting feature information of the detection target for each of the plural candidates based on the common feature quantity;
identifying the attribute based on the data; and
outputting the feature information corresponding to the identified attribute.

Supplementary Note 15

A storage medium storing a program executed by a computer, the program causing the computer to:
acquire data relating to a detection target;
extract, from the data, common feature quantity common to plural candidates of an attribute of the detection target;
detect feature information of the detection target for each of the plural candidates based on the common feature quantity;
identify the attribute based on the data; and
output the feature information corresponding to the identified attribute.

Supplementary Note 16

A learning device comprising
a learning means for learning a neural network which outputs, when data relating to a detection target is inputted thereto, information relating to common feature quantity common to plural candidates of an attribute of the detection target.

Supplementary Note 17

A learning method executed by a computer, comprising
learning a neural network which outputs, when data relating to a detection target is inputted thereto, information relating to common feature quantity common to plural candidates of an attribute of the detection target.

Supplementary Note 18

A storage medium storing a program executed by a computer, the program causing the computer to:
learn a neural network which outputs, when data relating to a detection target is inputted thereto, information relating to common feature quantity common to plural candidates of an attribute of the detection target.

Supplementary Note 19

A learning device comprising
a learning means for learn a neural network, a detector, and an identifier,
the neural network being configured to output, when data relating to a detection target is inputted thereto, information relating to common feature quantity common to plural candidates of an attribute of the detection target,
the detector being configured to output feature information of the detection target for each of the plural candidates in response to receiving an output result of the neural network as an input,
the identifier being configured to output an identification result of the attribute in response to receiving the output result of the neural network as an input,
wherein the learning means learns the detector for each of the plural candidates and the identifier by sharing parameters of the neural network.

Supplementary Note 20

A learning device configured to generate single convolutional neural network by:
individually learning plural convolutional neural network with the same structure using different training databases;
updating weight parameters of the plural convolutional neural networks based on learning results using different learning databases, respectively; and
sharing the weight parameters of the neural networks that have completed the individual learning.

Supplementary Note 21

A learning method executed by a computer,
when learning a neural network, a detector for each of plural candidates of an attribute of a detection target, and an identifier,
the learning method comprising
learning the detector for each of the plural candidates and the identifier by sharing parameters of the neural network,
the neural network being configured to output, when data relating to a detection target is inputted thereto, information relating to common feature quantity common to plural candidates of an attribute of the detection target,
the detector being configured to output feature information of the detection target for each of the plural candidates in response to receiving an output result of the neural network as an input,
the identifier being configured to output an identification result of the attribute in response to receiving the output result of the neural network as an input.

Supplementary Note 22

A storage medium storing a program executed by a computer, when learning a neural network, a detector for each of plural candidates of an attribute of a detection target, and an identifier,
the program causing the computer to:
learn the detector for each of the plural candidates and the identifier by sharing parameters of the neural network,
the neural network being configured to output, when data relating to a detection target is inputted thereto, information relating to common feature quantity common to plural candidates of an attribute of the detection target,
the detector being configured to output feature information of the detection target for each of the plural candidates in response to receiving an output result of the neural network as an input,
the identifier being configured to output an identification result of the attribute in response to receiving the output result of the neural network as an input.

While some non-limiting embodiments has been particularly shown and described with reference to example embodiments thereof, the disclosure is not limited to these example embodiments. It will be understood by those of ordinary skilled in the art that various changes in form and details may be made therein without departing from the spirit and scope of the disclosure as defined by the claims. In other words, it is needless to say that the disclosure includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS 1, 1A to 1C Face feature point detection device
1X Detection device
11 Image input means
12 Face detection means
13 Common feature quantity extraction means
14 Face feature point detection means
15 Face orientation identification means
16 Face feature point result output means

What is claimed is:
1. A detection device comprising:
at least one memory storing instructions; and
at least one processor configured to execute the instructions to:
acquire an image of a face of a person;
extract a feature quantity of the image using a neural network that has been trained to output information relating to the feature quantity when the image is input thereto, the feature quantity used for detection of feature points for plural candidates of a direction of the face;
respectively detect, for the plural candidates, plural sets of the feature points of the face based on the feature quantity using respective detectors trained to respectively output the plural sets of the feature points when the feature quantity output by the neural network is input thereto;
identify the direction based on the image using an identifier trained to output an identification result of the direction when the feature quantity output by the neural network is input thereto;
output, from the plural sets of the feature points, the set of the feature points corresponding to the identified direction; and
check the output set of the feature points against a database of feature points of the face of the person that are registered in advance.
2. The detection device according to claim 1, wherein the at least one processor identifies the direction based on the feature quantity.

3. The detection device according to claim 1,
wherein the respective detectors for the plural candidates and the identifier are learned by sharing parameters of the neural network.

4. The detection device according to claim 1,
wherein the at least one processor generates training data of the neural network based on the feature quantity corresponding to the identified direction.

5. The detection device according to claim 1,
wherein the plural candidates are divided into plural groups, and
wherein the at least one processor identifies the direction for each of the plural groups.

6. The detection device according to claim 1,
wherein the at least one processor is further configured to execute the instructions to perform identification relating to the face based on the output set of the feature points.

7. The detection device according to claim 1,
wherein the direction is an orientation of the face in the image.

8. A detection device comprising:
at least one memory storing instructions; and
at least one processor configured to execute the instructions to:
acquire an image of a face of a person;
extract a feature quantity of the image, the feature quantity used for detection of feature points for plural candidates of a direction of the face;
respectively detect, for the plural candidates, plural sets of the feature points of the face based on the feature quantity;
identify the direction based on the image;
output, from the plural sets of the feature points, the set of the feature points corresponding to the identified direction; and
check the output set of the feature points against a database of feature points of the face of the person that are registered in advance
wherein at least one processor uses:
a first neural network trained to output information relating to the feature quantity when the image is input thereto; and
a second neural network trained to output a feature quantity used to identify the direction when the image is input thereto, and
wherein the at least one processor respectively detects the plural sets of the feature points for the plural candidates using respective detectors trained to respectively output the plural sets of the feature points when the feature quantity output by the first neural network is input thereto, and
wherein the respective detectors for the plural candidates are learned by sharing parameters of the first neural network.

9. A detection method executed by a computer comprising:
acquiring an image of a face of a person;
extracting a feature quantity of the image using a neural network that has been trained to output information relating to the feature quantity when the image is input thereto, the feature quantity used for detection of feature points for plural candidates of a direction of the face;
respectively detecting, for the plural candidates, plural sets of the feature points of the face using respective detectors trained to respectively output the plural sets of the feature points when the feature quantity output by the neural network is input thereto;
identifying the direction using an identifier trained to output an identification result of the direction when the feature quantity output by the neural network is input thereto;
outputting, from the plural sets of the feature points, the set of the feature points corresponding to the identified direction; and
checking the output set of the feature points against a database of feature points of the face of the person that are registered in advance.

* * * * *